(12) United States Patent
Li et al.

(10) Patent No.: US 12,139,580 B2
(45) Date of Patent: Nov. 12, 2024

(54) CLASS OF NITROGEN-CONTAINING HETEROCYCLIC POLYMERS, A CLASS OF POLYMER MEMBRANES AND APPLICATIONS THEREOF

(71) Applicant: WUHAN LIMO TECHNOLOGY CO., LTD, Wuhan (CN)

(72) Inventors: Ming Li, Wuhan (CN); Junyu Liu, Wuhan (CN); Yunlan Liao, Wuhan (CN)

(73) Assignee: WUHAN LIMO TECHNOLOGY CO., LTD, Wuhan (CN)

( * ) Notice: Subject to any disclaimer, the term of this patent is extended or adjusted under 35 U.S.C. 154(b) by 0 days.

(21) Appl. No.: 18/747,971

(22) Filed: Jun. 19, 2024

(65) Prior Publication Data
US 2024/0336737 A1  Oct. 10, 2024

Related U.S. Application Data

(63) Continuation of application No. PCT/CN2023/126327, filed on Oct. 25, 2023.

(30) Foreign Application Priority Data

Nov. 14, 2022 (CN) .......................... 202211416825.2

(51) Int. Cl.
   C08G 73/06    (2006.01)
   B01D 69/06    (2006.01)
   B01D 71/62    (2006.01)

(52) U.S. Cl.
   CPC .......... C08G 73/0688 (2013.01); B01D 69/06 (2013.01); B01D 71/62 (2013.01); C08G 73/0627 (2013.01)

(58) Field of Classification Search
   None
   See application file for complete search history.

(56) References Cited

U.S. PATENT DOCUMENTS

2021/0009726 A1*  1/2021  Yan ....................... H01M 8/106

FOREIGN PATENT DOCUMENTS

| CN | 107910576 A | 4/2018 |
|---|---|---|
| CN | 111040137 A | 4/2020 |
| CN | 111954571 A | 11/2020 |

\* cited by examiner

*Primary Examiner* — Krishnan S Menon
(74) *Attorney, Agent, or Firm* — Nitin Kaushik

(57) ABSTRACT

The present invention discloses a class of nitrogen-containing heterocyclic polymers, a class of polymer membranes and applications thereof, wherein the nitrogen-containing heterocyclic polymers comprise structural units of following general formula:

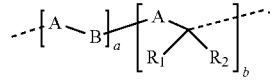

A nitrogen-containing heterocycles in the class of nitrogen-containing heterocyclic polymers have large steric hindrance and electron donating groups, which are beneficial for further improving stability of materials. The class of nitrogen-containing heterocyclic polymers can be formed membranes using commonly industrial methods such as coating. The prepared polymer membranes have advantages such as large scale, thin thickness, high strength, and excellent ion conductivity, which can be used in fuel cells, water electrolysis hydrogen production, metal-air batteries, flow batteries, carbon dioxide reduction, supercapacitors, electrodialysis, water treatment, membrane humidification, nickel hydrogen batteries, zinc manganese batteries, acid separation, salt lake lithium extraction, and other fields.

9 Claims, No Drawings

CLASS OF NITROGEN-CONTAINING HETEROCYCLIC POLYMERS, A CLASS OF POLYMER MEMBRANES AND APPLICATIONS THEREOF

CROSS-REFERENCE TO RELATED APPLICATIONS

The application claims priority to Chinese patent application No. 2022114168252, filed on Nov. 14, 2022, the entire contents of which are incorporated herein by reference.

TECHNICAL FIELD

The present invention relates to a technical field of polymer functional materials, and in particular to a class of nitrogen-containing heterocyclic polymers, a class of polymer membranes and applications thereof.

BACKGROUND

Fuel cells, hydrogen production from electrolytic water, metal-air batteries, flow batteries, carbon dioxide reduction, supercapacitors, acid separation, lithium extraction from salt lakes, etc., depend on functional polymer film materials, and the essence of such films lies in the selective permeability of ions. However, at present, such films are still very lacking, especially the highly stable and highly selective ion exchange membranes suitable for strong acid and alkali environments. The ion exchange membrane is composed of a polymer containing ion groups, and its stability is determined by the polymer chain skeleton and the ion groups on the skeleton.

In recent years, it has been proposed to use carbon chains as the chain skeleton of polymers to solve the stability of the skeleton. Various quaternary ammonium salt ions have also been developed as anion exchange groups. However, the majority of quaternary ammonium salt ions have low stability. In recent years, it has been found that N-methylpiperidinium quaternary ammonium salt ions have good stability. However, N-methylpiperidinium quaternary ammonium salt ions are generally only stable in medium concentration of alkali solutions or at room temperature. For example, Jannasch et al. reported that a class of linear poly (aryl N-methylpiperidinium) electrolyte in 2M sodium hydroxide aqueous solution could exist stably for 15 days at 60° C., but a cationic degradation is 5% within 15 days at 90° C. (reference: Jannasch P., et al., Adv. Funct. Mater. 2017, 1702758; DOI: 10.1002/adfm.201702758). Hu et al. reported that a class of branched poly (aryl N-methylpiperidinium) electrolyte could stably exist for 1500 hours at 80° C. in 1M aqueous potassium hydroxide solution, but 17% of the cations were degraded in 3M aqueous potassium hydroxide solution at 80° C. for 1500 hours (literature: Hu X., et al., Angew. Chem. Int. Ed. 2022, 61, e202114892; DOI: 10.1002/anie. 202114892). Chinese patent CN202011577765.3 also reported a cross-linked poly (aryl N-methylpiperidinium) electrolyte, soaking in 4M aqueous sodium hydroxide solution at 80° C. for 10 days, and a cation degradation occurred by 4.6%. Therefore, it is necessary to explore new quaternary ammonium ions in order to further develop new ion exchange membranes with excellent comprehensive properties, especially excellent alkaline stability.

SUMMARY

In order to solve problems in prior art, the present invention provides a class of nitrogen-containing heterocyclic polymers, a class of polymer membranes and applications thereof. The nitrogen-containing heterocycles in this kind of nitrogen-containing heterocyclic polymers have large steric hindrance and electron donating groups, which are conducive to further improving stability of materials. This class of polymer films has advantages of large size, thin thickness, high stability and high ionic conductivity, and can be used in many fields.

A technical solution adopted to achieve the objectives of the present invention is:

A class of nitrogen-containing heterocyclic polymers, comprising a following general structural unit:

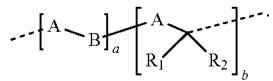

wherein: $R_1$ and $R_2$ are respectively hydrogen atom, methyl group, ethyl group, trifluoromethyl group, pyridyl group, phenyl group, o-methylphenyl group, m-methylphenyl group, p-methylphenyl group or mesitylene group; a is any integer greater than or equal to 1; b is any integer greater than or equal to 0, generally within 10 million.

A group is selected from following structural formulas:

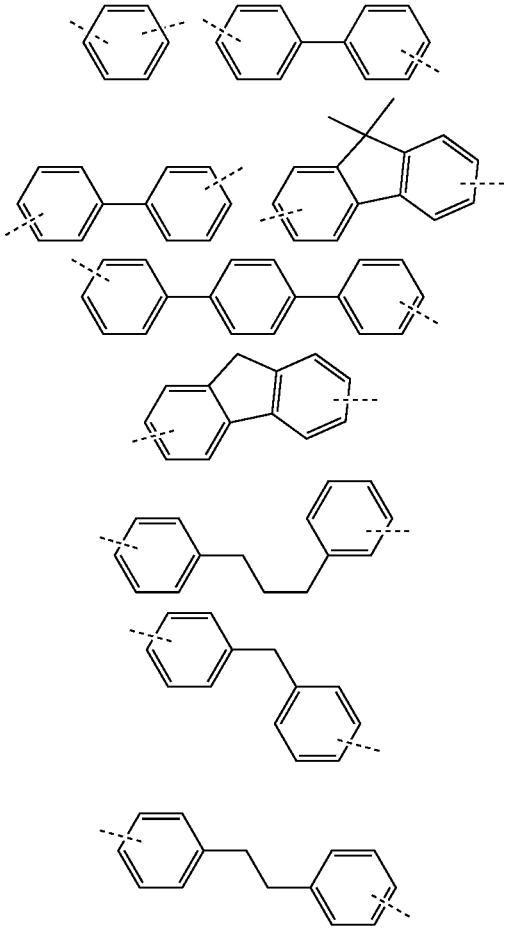

-continued

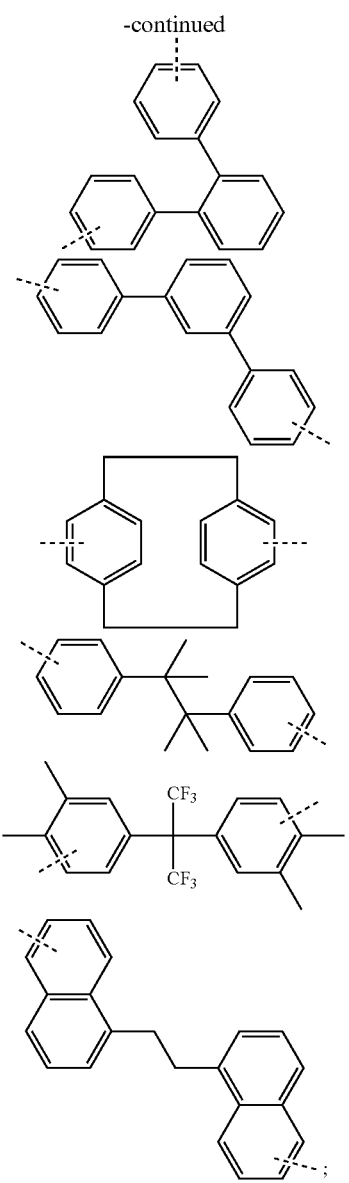

B group is a nitrogen-containing heterocyclic ring and is selected from following structural formulas:

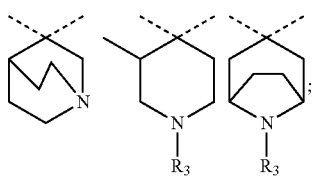

wherein: $R_3$ is a hydrogen atom, methyl group, ethyl group, propyl group, butyl group, pentyl group, hexyl group, cyclopropyl group, isopropyl group, isobutyl group, tert butyl group, cyclopentyl group, cyclohexyl group, or N, N, N-trimethylpentamine group.

When both A and B are multiple groups, a combination of A and B in A-B is random, and an arrangement of different combinations is also random.

Furthermore, the class of nitrogen-containing heterocyclic polymers are prepared by following methods:

In presence of an acid catalyst, a nitrogen-containing heterocyclic monomer C undergoes a Friedel-Crafts reaction with an aromatic monomer D, and a molar ratio of the nitrogen-containing heterocyclic monomer C to the aromatic monomer D is 0.5-1.5:1, and the nitrogen-containing heterocyclic polymers are obtained.

Furthermore, the class of nitrogen-containing heterocyclic polymers are prepared by following methods:

In presence of an acid catalyst, a nitrogen-containing heterocyclic monomer C, an aromatic monomer D, and a ketone monomer E undergo a Friedel-Crafts reaction, a molar ratio of the nitrogen-containing heterocyclic monomer C, the ketone monomer E, and the aromatic monomer D is 0.2-0.999:0.001-0.8:1, and the nitrogen-containing heterocyclic polymers are obtained;

the ketone monomer E is selected from one or more combinations of following structures:

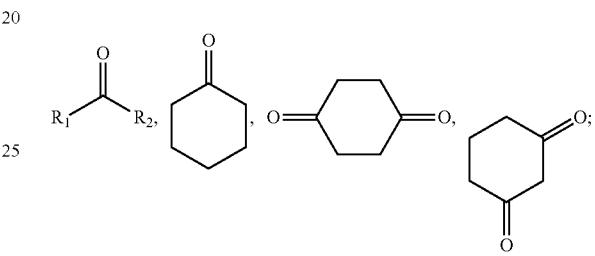

wherein, $R_1$ and $R_2$ are respectively hydrogen atom, methyl group, ethyl group, trifluoromethyl group, pyridine group, phenyl group, o-methylphenyl group, m-methylphenyl group, p-methylphenyl group or mesitylene group.

Furthermore, the class of nitrogen-containing heterocyclic polymers are prepared by following methods:

In presence of an acid catalyst, a nitrogen-containing heterocyclic monomer C, an aromatic monomer D, and an aromatic crosslinking agent monomer F undergo a Friedel-Crafts reaction, a molar ratio of the nitrogen-containing heterocyclic monomer C, the aromatic monomer D, and the aromatic crosslinking agent monomer F is 1:0.8-1.2:0.001-0.3, and the nitrogen-containing heterocyclic polymers are obtained;

the aromatic crosslinking agent monomer F is one or more combinations of triphenylmethane, 1,3,5-triphenylbenzene, triptycene, 9,9'-spirobifluorene, tetraphenyl ethylene, tetraphenylmethane, and hexaphenylbenzene.

Furthermore, the nitrogen-containing heterocyclic monomer C is one or more combinations of

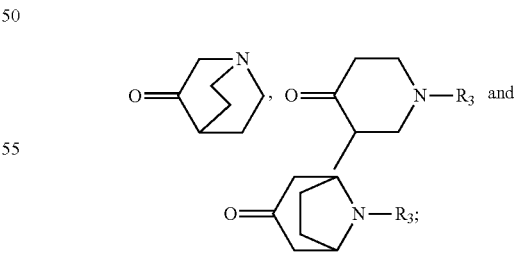

the aromatic monomer D is one or more combinations of benzene, biphenyl, 4,4-dimethylbiphenyl, fluorene, 9,9-dimethylfluorene, para-triphenyl, meta-triphenyl, ortho-triphenyl, diphenylmethane, 1,2-diphenylethane, 1,3-diphenylpropane, para-xylene dimer, 2,2-bis (3,4-dimethylphenyl) hexafluoropropane, 2,3-dimethyl-2,3-diphenylbutane, and 1,2-di (1-naphthyl) ethane.

The acid catalyst is one or more combinations of trifluoromethanesulfonic acid, trifluoroacetic acid, acetic acid, trichloroacetic acid, methylsulfonic acid, pentafluoropropionic acid, heptafluorobutyric acid, and perfluorosulfonic acid resin.

Quaternary ammonium salt polymers, wherein a quaternary ammonium structural formula of a nitrogen site of a nitrogen-containing heterocycle in general formula is selected from following structural formulas:

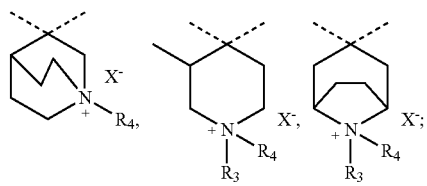

$R_4$ is any one of methyl group, ethyl group, propyl group, butyl group, pentyl group, hexyl group, heptyl group, octyl group, nonyl group, decyl group, cyclopropyl group, isopropyl group, isobutyl group, tert-butyl group, cyclopentyl group, cyclohexyl group, and N, N, N-trimethylpentamine group.

A preparation method of the quaternary ammonium salt polymers comprises following steps:

In presence of an alkali, a quaternization reaction is carried out between the nitrogen-containing heterocyclic polymers and a monohalogenated compound, with a molar ratio of 1-20:1 between the monohalogenated compound and the N site, to obtain the quaternary ammonium salt polymer;

the monohalogenated compound is one or more combinations of iodomethane, iodoethane, iodopropane, iodobutane, iodopentane, iodohexane, iodoheptane, iodooctane, iodononane, iododecane, bromomethane, bromoethane, bromopropane, bromobutane, bromopentane, bromohexane, bromoheptane, bromooctane, bromononane, bromodecane, 2-bromoethylamine, 2-bromoethyl alcohol, cyclopropyl iodine, isopropyl iodine, isobutyl iodine, cyclopentyl iodine, cyclohexyl iodine and (5-bromopentyl) trimethylammonium bromide;

the alkali is one or more combinations of sodium bicarbonate, potassium bicarbonate, cesium bicarbonate, sodium carbonate, potassium carbonate, cesium carbonate, calcium carbonate, sodium hydroxide, potassium hydroxide, calcium oxide, calcium hydroxide, trimethylamine, triethylamine, N, N-dimethylethylenediamine and N, N-diisopropylethylamine.

Quaternary ammonium cross-linked polymers prepared by following method:

in presence of alkali or no alkali, a quaternized cross-linking reaction is carried out between the nitrogen-containing heterocyclic polymers and a polyhalogenated compound, and nitrogen sites involved in the ammoniated cross-linking reaction accounted for 0.001-10% of all nitrogen sites; after the reaction is completed, partial ammoniated cross-linked intermediate polymers are obtained, and then, remaining nitrogen sites of the intermediate polymer undergo quaternization without crosslinking reaction with a monohalogenated compound, to obtain the quaternary ammonium crosslinked polymers;

or in presence of alkali or no alkali, a quaternized reaction without cross-linking is carried out between the nitrogen-containing heterocyclic polymers and a monohalogenated compound, and nitrogen sites participating in the quaternized reaction without cross-linking accounted for 0.90-99.999% of all nitrogen sites; after the reaction is completed, partial quaternized intermediate polymers are obtained; a quaternized cross-linking reaction is carried out between remaining nitrogen sites of the intermediate polymers and a polyhalogenated compound, to obtain the quaternary ammonium crosslinked polymers;

or in presence of alkali or no alkali, a quaternized cross-linking reaction is carried out between the nitrogen-containing heterocyclic polymers, a polyhalogenated compound and a monohalogenated compound at the same time, and nitrogen sites participating in the quaternized cross-linking reaction account for 0.001-10% of all nitrogen sites; after the reaction is completed, the quaternary ammonium cross-linked polymers are obtained;

the polyhalogenated compound is selected from one or more combinations of following structures:

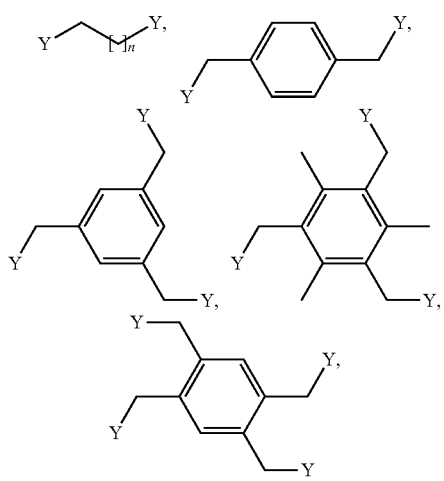

wherein, Y is F, Cl, Br or I, and n is an integer between 0 and 12;

the monohalogenated compound is one or more combinations of iodomethane, iodoethane, iodopropane, iodobutane, iodopentane, iodohexane, iodoheptane, iodooctane, iodononane, iododecane, bromomethane, bromoethane, bromopropane, bromobutane, bromopentane, bromohexane, bromoheptane, bromooctane, bromononane, bromodecane, cyclopropyl iodine, isopropyl iodine, isobutyl iodine, cyclopentyl iodine, cyclohexyl iodine and (5-bromopentyl) trimethylammonium bromide;

the alkali is one or more combinations of sodium bicarbonate, potassium bicarbonate, cesium bicarbonate, sodium carbonate, potassium carbonate, cesium carbonate, calcium carbonate, sodium hydroxide, potassium hydroxide, calcium oxide, calcium hydroxide, trimethylamine, triethylamine, N, N-dimethylethylenediamine and N, N-diisopropylethylamine.

A polymer flat membrane prepared by following method:

dissolving any one or more of the nitrogen-containing heterocyclic polymers, the quaternary ammonium salt polymers, and the quaternary ammonium crosslinked polymers in an organic solvent, obtaining a polymer solution;

or dissolving at least one of the nitrogen-containing heterocyclic polymers and the intermediate polymers in an organic solvent with the monohalogenated compound and/or the polyhalogenated compound, obtaining a polymer solution; and casting or moulding the polymer solution onto a substrate, drying to obtain the polymer flat membrane;

the organic solvent is one or more combinations of dimethyl sulfoxide, N, N-dimethylformamide, N, N-dimethylacetamide, N-methylpyrrolidone, tetrahydrofuran, chloroform, dichloromethane, toluene, ethylbenzene, xylene, and ethyl acetate;

the substrate is a glass sheet, a copper sheet, an iron sheet, a ceramic sheet, a polytetrafluoroethylene sheet, a polyethylene terephthalate membrane, a polyamide membrane, a polytetrafluoroethylene membrane, a polyethylene membrane, a polypropylene membrane, a polyimide membrane, a carbon fiber membrane, or a glass fiber membrane.

A polymer hollow fiber membrane prepared by following method:

dissolving any one or more of the nitrogen-containing heterocyclic polymers, the quaternary ammonium salt polymers, and the quaternary ammonium crosslinked polymers in an organic solvent, obtaining a polymer solution;

or dissolving at least one of the nitrogen-containing heterocyclic polymers and the intermediate polymers in an organic solvent with the monohalogenated compound and/or the polyhalogenated compound, obtaining a polymer solution; and soaking a hollow fiber base membrane in the polymer solution, removing after soaking, and drying to obtain the polymer hollow fiber membrane; or using the polymer solution to prepare the polymer hollow fiber membrane by dry-wet spinning method;

the organic solvent is one or more combinations of dimethyl sulfoxide, N, N-dimethylformamide, N,N-dimethylacetamide, N-methylpyrrolidone, tetrahydrofuran, chloroform, dichloromethane, toluene, ethylbenzene, xylene, and ethyl acetate;

the hollow fiber membrane comprises one of a ceramic hollow fiber membrane, a polytetrafluoroethylene hollow fiber membrane, a polyvinylidene fluoride hollow fiber membrane, a polyethylene terephthalate based hollow fiber membrane, a polyamide hollow fiber membrane, a polyethylene hollow fiber membrane, a polypropylene hollow fiber membrane, a carbon fiber hollow fiber membrane, and a glass hollow fiber membrane.

A proton exchange membrane prepared by following method:

soaking the polymer flat membrane and the polymer hollow fiber film in phosphoric acid aqueous solution respectively, a concentration of the phosphoric acid aqueous solution is 0.1-20 M, and a soaking temperature is 0-90° C., to obtain the proton exchange membrane.

An anion exchange membrane prepared by following method:

Soaking the polymer flat membrane or the polymer hollow fiber film in aqueous hydroxide solution, bromide solution, chloride solution, fluoride solution, nitrate solution or bicarbonate solution, and cleaning with pure water after soaking, obtain the anion exchange membrane; and the hydroxide is one or more combinations of lithium hydroxide, sodium hydroxide, potassium hydroxide, cesium hydroxide, and ammonium hydroxide;

the bromide is one or more combinations of sodium bromide, potassium bromide, cesium bromide, ammonium bromide, magnesium bromide, and calcium bromide;

the chloride is one or more combinations of sodium chloride, potassium chloride, cesium chloride, ammonium chloride, magnesium chloride, and calcium chloride;

the fluoride is one or more combinations of sodium fluoride, potassium fluoride, cesium fluoride, ammonium fluoride, magnesium fluoride, and calcium fluoride;

the nitrate is one or more combinations of sodium nitrate, potassium nitrate, cesium nitrate, ammonium nitrate, magnesium nitrate, and calcium nitrate;

the bicarbonate is one or more combinations of sodium bicarbonate, potassium bicarbonate, cesium bicarbonate, ammonium bicarbonate, magnesium bicarbonate, and calcium bicarbonate.

Applications of the polymer flat membrane, the polymer hollow fiber film, the proton exchange membrane, and the anion exchange membrane, in alkaline fuel cells, alkaline water electrolysis hydrogen production, metal-air batteries, flow batteries, carbon dioxide reduction, supercapacitors, nickel hydrogen batteries, zinc manganese batteries, acid separation, salt lake lithium extraction, electrodialysis, water treatment, and membrane humidification, respectively.

Compared with prior art, the advantages and beneficial effects of the present invention lie in:

1. Compared to reported N-piperidine ring, the nitrogen-containing heterocycles in the nitrogen-containing heterocyclic polymers of the present invention have large steric hindrance and electron donating groups. These groups act as ion exchange groups, and the exchanged groups have high stability in various environments.
2. The present invention first uses 3-quinuclidinone, N-alkyl-3-methyl-4-piperidone, and 8-alkyl-8-azabicyclic [3.2.1] octane-3-one as monomers for preparing ion exchange membranes. These monomers are inexpensive, easy to obtain, and easy to store.
3. The preparation method of the nitrogen-containing heterocyclic polymer of the present invention is simple, the conditions are mild, easy to operate, a preparation cost is low, and it can be industrially produced on a large scale.
4. The nitrogen-containing heterocyclic polymer of the present invention can be filmed using commonly used industrial methods such as coating. The prepared polymer film has advantages such as large scale, thin thickness, high mechanical strength, good stability, and excellent ion conductivity, and can be used in fuel cells, water electrolysis hydrogen production, metal-air batteries, flow batteries, carbon dioxide reduction, supercapacitors, electrodialysis, water treatment, membrane humidification, nickel hydrogen batteries, zinc manganese batteries, acid separation, salt lake lithium extraction, and other fields.

DETAILED DESCRIPTION OF THE EMBODIMENTS

The present invention is described in detail below in connection with specific embodiments, but these embodiments are not in any sense interpreted as limiting the scope of protection of the present invention.

Embodiment 1

1, 2.303 g (10 mmol) p-terphenyl (CAS No. 92-94-4) and 1.616 g (10 mmol) 3-quinuclidinone hydrochloride (CAS No. 1193-65-3) were dissolved in 100 mL dichloromethane, stirred at −5° C., added 5 mL trifluoromethanesulfonic acid and 1 mL trifluoroacetic acid slowly, and continued to stir at 0° C. for 72 hours after dripping, to obtain a viscous solution, washed the viscous solution with 60 mL pure water, and dried at 90° C. for 30 hours. 3.21 g pale yellow powder like nitrogen-containing heterocyclic polymers P1a were obtained with a yield of 90%.

$^1$HNMR (600 MHz, DMSO-$d_6$, ppm) δH=7.78-7.52 (12H), 4.34 (2H), 3.51 (1H), 3.21 (2H), 3.13 (2H), 1.99 (2H), 1.79 (2H).

2, 1.78 g the polymers P1a, 1.42 g (10 mmol) iodomethane and 1.382 g (10 mmol) potassium carbonate were dissolved in 10 mL dimethyl sulfoxide and stirred reaction at 25° C. for 10 hours. After the reaction was completed, the resulting product was washed three times with 60 mL pure water and dried at 90° C. for 30 hours. A 2.2 g pale yellow powder like quaternary ammonium salt polymers P1b were obtained with a yield of 89%. $^1$HNMR (600 MHz, DMSO-$d_6$, ppm) $^δ$ H=7.75-7.50 (12H), 4.49 (2H), 3.52 (1H), 3.44 (2H), 3.29 (2H), 3.18 (3H), 2.05 (2H), 1.85 (2H).

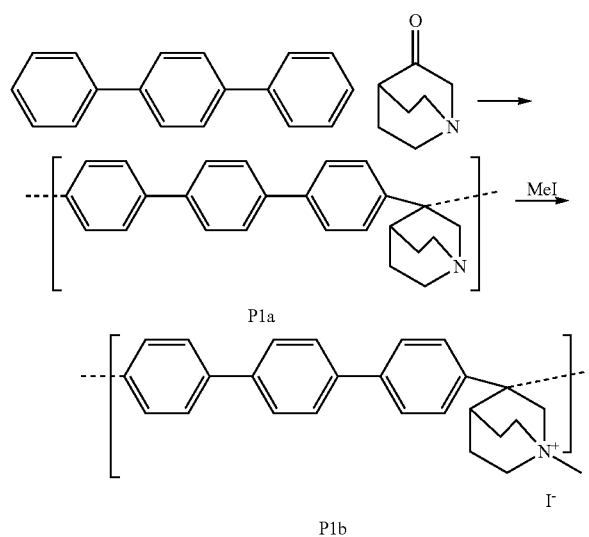

3, 100 mg the polymers P1a was dissolved in 20 mL dimethyl sulfoxide to obtain polymer solution. The polymer solution was coated on a glass plate, and the glass plate was baked at 100° C. for 15 hours to obtain polymer flat membrane F1a. A thickness of the F1a was 15 um, a tensile strength was 15 MPa, and a Young's modulus was 265 MPa. The F1a was used for nanofiltration separation of aluminum oxidation waste acid: a waste liquid with sulfuric acid concentration of 150 g/L and aluminum ion concentration of 20 g/L was used as mother liquid, filtration at 3 atmospheres and room temperature. In the filtrate, the sulfuric acid concentration was increased to 200 g/L and the aluminum ion concentration was reduced to 8 g/L. The F1a was used for diffusion dialysis of waste acid from aluminum oxidation. At room temperature, a concentration of sulfuric acid and aluminum ion in the dialysis solution was 130 g/L and 0.5 g/L.

4, the F1a was soaked in 1 M phosphoric acid aqueous solution at room temperature for 5 hours, a film was taked out and washed with pure water three times, and dried in an oven at 100° C. under nitrogen protection for 5 hours to obtain a proton exchange film F1b. A tensile strength of the F1b was 13 MPa and a Young's modulus was 265 MPa. At 160° C., a proton conductivity of the F1b is 62 mS/cm. At 180° C., a proton conductivity of the F1b is 102 mS/cm.

5, 100 mg of the quaternary ammonium salt polymers P1b were dissolved in 20 ml N-methylpyrrolidone to obtain a polymer solution. The polymer solution was coated on a glass plate and the glass plate was baked at 120° C. for 20 hours to obtain an iodide ion exchange membrane F1c with a tensile strength of 16 MPa and a Young's modulus of 235 MPa. At 80° C., a conductivity of the F1c is 80 ms/cm.

6, After soaking the F1c in 1 M NaCl solution at room temperature for 5 hours, the film was taked out and washed three times in pure water and dried in an oven at 100° C. under nitrogen protection for 5 hours, a chloride ion exchange film F1d was obtained. A tensile strength of the F1d was 15 MPa and a Young's modulus was 221 MPa. At 80° C., a conductivity of the F1d is 105 mS/cm. When the F1d was used to extract lithium from salt lake by diffusion dialysis method, a concentration of lithium ion in mother liquor was 6 g/L, and a concentration of magnesium ion was 120 g/L. At room temperature, a concentration of lithium ion and magnesium ion in a dialysis liquor was 5.8 g/L and 0.8 g/L.

7, the F1c was soaked in 1 M NaBr aqueous solution at room temperature for 5 hours, the film was taked out and washed three times with pure water, and dried in an oven at 120° C. under nitrogen protection for 5 hours to obtain a bromine ion exchange film F1e. A tensile strength of the F1e was 16 MPa and a Young's modulus was 256 MPa. At 80° C., a conductivity of the F1e is 98 mS/cm. When the F1e was used in all-vanadium flow battery, a vanadium ion permeability is $5×10^{-10}$ cm$^2$/s. When the F1e was immersed in 1.5 M $VO^{2+}$/3M $H_2SO_4$ solution for 30 days at 80° C., a conductivity is only reduced by 2%, and the all-vanadium flow battery was assembled, and a Coulomer efficiency was 98.5%.

8, the F1c was immersed in 1 M $NaHCO_3$ aqueous solution at room temperature for 5 hours, a film was was taked out and washed three times with pure water, and dried for 10 hours in the oven at 60° C. under nitrogen protection. A bicarbonate ion exchange film F1f was obtained. A tensile strength of the F1f was 13 MPa and a Young's modulus was 265 MPa. At 80° C., a conductivity of F1f is 54 mS/cm.

9, the F1c was immersed in 1 M $NaNO_3$ aqueous solution at room temperature for 5 hours, a film was was taked out and washed three times with pure water, and dried in the oven at 60° C. under nitrogen protection for 10 hours, to obtain a nitrate ion exchange film F1g. A tensile strength of the F1g was 19 MPa and a Young's modulus was 268 MPa. At 80° C., a conductivity of F1g was 51 mS/cm.

10, the F1c was soaked in 1 M NaOH aqueous solution at room temperature for 5 hours, a film was was taked out and washed with pure water and dried in an oven at 60° C. under nitrogen protection for 10 hours to obtain a basic anion exchange film F1h. A tensile strength of the F1h was 19 MPa and a Young's modulus was 278 MPa. At 80° C., a conductivity of the F1h is 125 mS/cm. The F1h was used as a separator for alkaline fuel cells and soaked in 10 M NaOH aqueous solution for 30 days without degradation. At 80° C., a water absorption rate of the F1h is 2%, and a water absorption swelling rate is 3%. At 80° C. and 2 atmospheres, the F1h was used as a diaphragm for alkaline fuel cells with a power density of 1.8 W/cm$^2$.

Embodiment 2

1, 2.303 g (10 mmol) of p-terphenyl (CAS No. 92-94-4, Aladdin reagent) and 1.272 g (10 mmol) of N-methyl-3-methyl-4-piperidone (CAS No.4629-80-5, Aladdin reagent) were dissolved in 120 mL dichloromethane, stirred at 0° C. and added 5 mL trifluoromethanesulfonic acid and 2 mL trifluoroacetic acid slowly, and after dripping, continued to stir at 0° C. for 72 hours to obtain a viscous solution, wash the viscous solution with 60 mL pure water, and dried at 90° C. for 30 hours. Nitrogen-containing heterocyclic polymers P2a with 3.12 g pale yellow powder were obtained with a yield of 92%.

$^1$HNMR (600 MHz, DMSO-$d_6$, ppm) δH=7.76-7.53 (12H), 3.61 (2H), 3.47 (1H), 3.26 (2H), 3.12 (2H), 3.02 (3H), 1.05 (3H).

2, 1.698 g the nitrogen-containing heterocyclic polymer P2a, 1.42 g (10 mmol) iodomethane and 1.382 g (10 mmol) potassium carbonate were dissolved in 9 mL dimethyl sulfoxide and stirred reaction at 40° C. for 10 hours. After the reaction was completed, a resulting product was washed three times with 20 mL pure water and dried at 90° C. for 30 hours. 2.12 g pale yellow powder like quaternary ammonium salt polymers P2b were obtained with a yield of 88%.

$^1$ HNMR (600 MHz, DMSO-$d_6$, ppm) $^δ$ H=7.73-7.52 (12H), 3.72 (2H), 3.52 (1H), 3.31 (2H), 3.19 (2H), 3.08 (6H), 1.12 (3H).

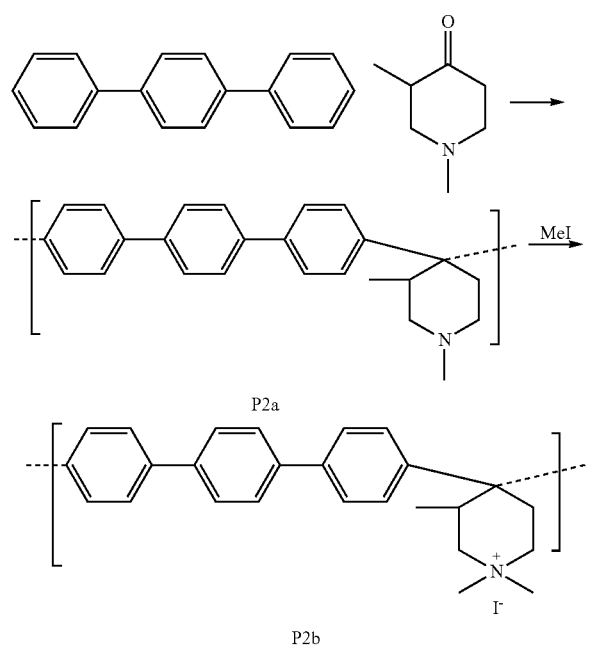

3, 100 mg of the nitrogen-containing heterocyclic polymer P2a was dissolved in 20 mL dimethyl sulfoxide to obtain a polymer solution. The polymer solution was coated on a glass plate and the glass plate was dried in the oven at 100° C. for 20 hours to obtain a polymer flat membrane F2a. A thickness of the F2a was 16 um, a tensile strength was 21 MPa, and a Young's modulus was 289 MPa. The F2a was used for nanofiltration separation of aluminum oxidation waste acid: a waste liquid with sulfuric acid concentration of 150 g/L and aluminum ion concentration of 20 g/L was used as mother liquid, filtration at 3 atmospheres and room temperature. In a filtrate, the sulfuric acid concentration was increased to 198 g/L and the aluminum ion concentration was reduced to 9 g/L. The F2a was used for the diffusion dialysis of aluminum oxidation waste acid. At room temperature, a concentration of sulfuric acid and aluminum ion in the dialysis solution was 135 g/L and 0.4 g/L.

4, the F2a was soaked in 1 M phosphoric acid aqueous solution at room temperature for 6 hours, a film was taked out and washed with pure water three times, and dried in an oven at 80° C. under nitrogen protection for 6 hours to obtain a proton exchange film F2b. A tensile strength of the F2a was 18 MPa and a Young's modulus was 285 MPa. At 160° C., a proton conductivity of the F2b is 66 mS/cm. At 180° C., a proton conductivity of the F2b is 110 mS/cm.

5, 100 mg the polymers P2b was dissolved in 20 mL N-methylpyrrolidone to obtain a polymer solution. The polymer solution was coated on a glass plate and dried in the oven at 120° C. for 20 hours to obtain an iodide ion exchange film F2c. A tensile strength of the F2c was 22 MPa and a Young's modulus was 279 MPa. At 80° C., a conductivity of the F2c is 82 mS/cm.

6, the F2c was immersed in 1 M NaCl aqueous solution at room temperature for 5 hours, a film was taked out and washed three times with pure water, and dried in an oven at 80° C. under nitrogen protection for 6 hours to obtain a chloride ion exchange film F2d, a tensile strength of the F2d was 25 MPa and a Young's modulus was 305 MPa. At 80° C., a conductivity of the F2d is 102 mS/cm. When F2d was used to extract lithium from salt lake by diffusion dialysis method, a concentration of lithium ion in mother liquor was 6 g/L, a concentration of magnesium ion was 120 g/L, and a concentration of lithium ion and magnesium ion in a dialysis liquor were 5.6 g/L and 0.6 g/L respectively at room temperature.

7, the F2c was immersed in 1 M NaBr aqueous solution at room temperature for 5 hours, a film was taked out and washed three times with pure water, and dried in an oven at 80° C. under nitrogen protection for 5 hours to obtain a bromine ion exchange film F2e, a tensile strength of the F2e was 23 MPa and a Young's modulus was 301 MPa. At 80° C., a conductivity of the F2e is 101 mS/cm. When the F2e was used in all-vanadium flow battery, a vanadium ion permeability is $4 \times 10^{-10}$ cm$^2$/s. When the F2e was immersed in 1.5 M VO$^{2+}$/3M H$_2$SO$_4$ solution for 30 days at 80° C., the conductivity is only reduced by 1%, and the all-vanadium flow battery was assembled, and a Coulometry efficiency is 98.2%.

8, the F2c was immersed in 1 M NaHCO$_3$ aqueous solution at room temperature for 5 hours, a film was taked out and washed with pure water three times, and dried in the oven at 60° C. under nitrogen protection for 5 hours to obtain a bicarbonate ion exchange membrane F2f. A tensile strength of the F2f was 19 MPa and a Young's modulus was 279 MPa. At 80° C., a conductivity of the F2f was 61 mS/cm.

9, the F2c was immersed in 1 M NaNO$_3$ aqueous solution at room temperature for 5 hours, washed with pure water three times after a film was taken out, and dried in the oven at 60° C. under nitrogen protection for 5 hours to obtain a nitrate ion exchange membrane F2g, a tensile strength of the F2g is 18 MPa, and a Young's modulus is 298 MPa. At 80° C., a conductivity of the F2g is 54 mS/cm. 10, the F2c was soaked in 1 M NaOH aqueous solution at room temperature for 5 hours, a film was taked out and washed with pure water and dried in the oven at 60° C. under nitrogen protection for 5 hours to obtain a basic anion exchange film F2h. A tensile strength of the F2h was 21 MPa and a Young's modulus was 312 MPa. At 80° C., a conductivity of F2h was 120 mS/cm. F2h was used as a separator for alkaline fuel cells and immersed in 10 M NaOH aqueous solution for 30 days with no observable degradation. At 80° C., a water absorption rate of the F2h is 10%, and a water absorption swelling rate is 9%. At 80° C. and 2 atmospheres, the F2h was used as a diaphragm for alkaline fuel cells with a power density of 1.5 W/cm$^2$.

Embodiment 3

1, 2.303 g (10 mmol) p-terphenyl (CAS NO. 92-94-4) and 1.392 g (10 mmol) 8-alkyl-8-azabicyclic [3.2.1] octane-3- one (CAS NO.532-24-1) were dissolved in 200 mL dichloromethane, stirred at 0° C., and added 5 mL trifluoromethanesulfonic acid and 1 mL trifluoroacetic acid slowly, afte dripping, heated up to 30° C., continued to stir for 25 hours, to obtain a viscous solution, washed the viscous solution with 60 mL pure water in turn, and dried under vacuum at 90° C. for 30 hours. A pale yellow powder like nitrogen-containing heterocyclic polymers P3a with 3.21 g was obtained with a yield of 91%.

$^1$HNMR (600 MHz, DMSO-$d_6$, ppm) $^\delta$ H=7.74 to 7.35 (12H), 3.38 (2H), 3.15 (2H), 2.85 (2H), 2.53 (3H), 1.92 (2H), 1.57 (2H).

2, 1.758 g the nitrogen-containing heterocyclic polymers P3a and 2.84 g (20 mmol) iodomethane were dissolved in 10 mL dimethyl sulfoxide and stirred reaction at 60° C. for 10 hours. After the reaction was completed, a resulting product was washed three times in 20 mL pure water and dried at 90° C. for 30 hours. 2.23 g pale yellow powder like quaternary ammonium salt polymers P3b were obtained with a yield of 90%.

$^1$HNMR (600 MHz, DMSO-$d_6$, ppm) δH=7.81-7.52 (12H), 3.45 (2H), 3.22 (2H), 2.89 (2H), 2.67 (6H), 1.98 (2H), 1.68 (2H).

oxidation waste acid. At room temperature, a concentration of sulfuric acid and aluminum ion in the dialysis solution was 138 g/L and 0.6 g/L.

4, the F3a was soaked in 1 M phosphoric acid aqueous solution at room temperature for 6 hours, a film was taked out and washed with pure water three times, and dried in an oven at 80° C. under nitrogen protection for 6 hours to obtain a proton exchange film F3b, a tensile strength of the F3b was 21 MPa and a Young's modulus was 286 MPa. At 160° C., a proton conductivity of the F3b is 54 mS/cm. At 180° C., a proton conductivity of the F3b is 98 mS/cm.

5, 100 mg the polymers P3b were dissolved in 20 ML N-methylpyrrolidone to obtain a polymer solution, the polymer solution was coated on a glass plate, dried the glass plate in an oven at 80°° C. for 5 hours, and then heated up to 120° C. for 20 hours to obtain an iodide ion exchange film F3c. A tensile strength of the F3c was 22 MPa, a Young's modulus was 305 MPa. At 80° C., a conductivity of F3c was 79 mS/cm.

6, the F3c was soaked in 1 M NaCl solution for 5 hours at room temperature, washed with pure water three times after a film was taken out, and dried in 80° C. oven under nitrogen protection for 6 hours to obtain a chloride ion

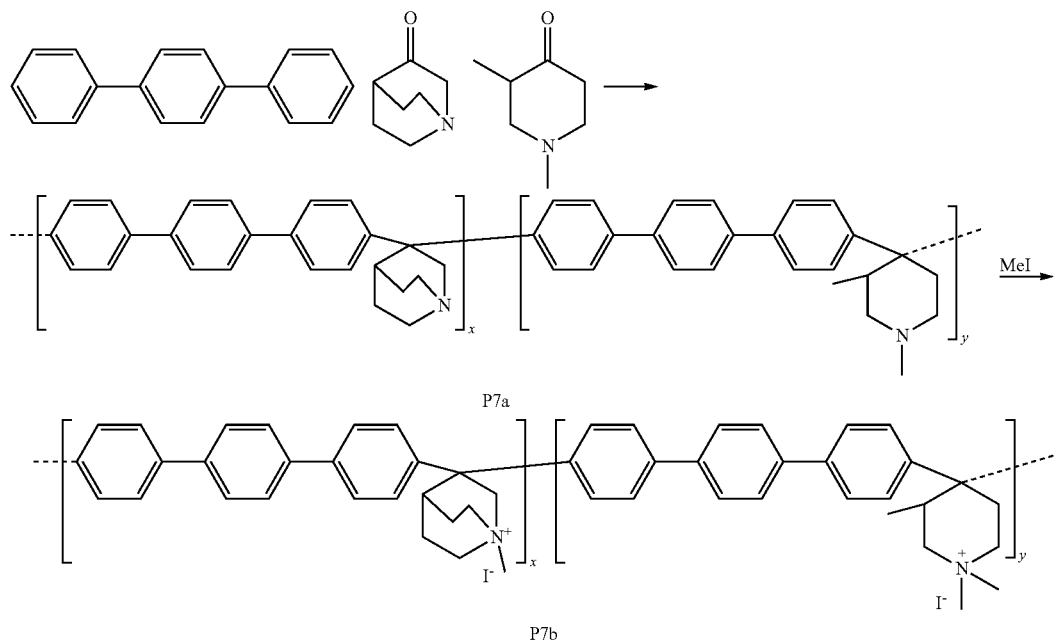

3, 100 mg of the nitrogen-containing heterocyclic polymers P3a was dissolved in 20 mL N-methylpyrrolidone to obtain a polymer solution. The polymer solution was coated on a glass plate and baked at 100° C. for 20 hours to obtain a polymer flat membrane F3a. A thickness of the F3a was 14 um, a tensile strength was 25 MPa and a Young's modulus was 316 MPa. The F3a was used for nanofiltration separation of aluminum oxidation waste acid: a waste liquid with sulfuric acid concentration of 150 g/L and aluminum ion concentration of 20 g/L was used as mother liquid, filtration at 3 atmospheres and room temperature. In a filtrate, the concentration of sulfuric acid was increased to 185 g/L and the concentration of aluminum ion was reduced to 10 g/L. The F3a was used for the diffusion dialysis of aluminum exchange film F3d. A tensile strength of the F3d is 26 MPa and a Young's modulus is 336 MPa. At 80° C., a conductivity of the F3d is 101 mS/cm. When the F3d was used to extract lithium from salt lake by diffusion dialysis method, a concentration of lithium ion in mother liquor was 6 g/L, a concentration of magnesium ion was 120 g/L, and a concentration of lithium ion and magnesium ion in a dialysis liquor was 5.7 g/L and 1.1 g/L at room temperature.

7, the F3c was soaked in 1 M NaBr aqueous solution at room temperature for 5 hours, a film was taked out and washed three times with pure water, and dried in an oven at 80° C. under nitrogen protection for 5 hours to obtain a bromine ion exchange film F3e. A tensile strength of the F3e was 25 MPa and a Young's modulus was 328 MPa. At 80° C., a conductivity of the F3f is 96 mS/cm. When the F3e was used in all-vanadium flow battery, a vanadium ion permeability is 3×10⁻¹⁰ cm²/s. When F3e was immersed in 1.5 M $VO^{2+}$/3M $H_2SO_4$ solution for 30 days at 80° C., a conductivity was only reduced by 2%, and the all-vanadium flow battery was assembled, and a Coulomer efficiency was 97.5%.

8, the F3c was soaked in 1 M $NaHCO_3$ aqueous solution at room temperature for 5 hours, washed with pure water three times after a film was taken out, and dried in the oven at 60° C. under nitrogen protection for 5 hours to obtain a bicarbonate ion exchange film F3f. A tensile strength of the F3f is 22 MPa and a Young's modulus is 288 MPa. At 80° C., a conductivity of the F3f is 66 mS/cm.

9, the F3c was immersed in 1 M $NaNO_3$ aqueous solution at room temperature for 5 hours, washed with pure water three times after a film was taken out, and dried in the oven at 60° C. under nitrogen protection for 5 hours to obtain a nitrate ion exchange film F3g. A tensile strength of the F3g was 20 MPa and a Young's modulus was 273 MPa. At 80° C., a conductivity of F3g was 56 mS/cm.

10, the F3c was soaked in 1 M NaOH aqueous solution at room temperature for 5 hours, washed with pure water after a film was taken out, and dried in the oven at 60° C. under nitrogen protection for 5 hours to obtain a basic anion exchange film F3h, a tensile strength of the F3h was 25 MPa, and a Young's modulus was 356 MPa. At 80° C., a conductivity of the F3h is 112 mS/cm. The F3h was used as a separator for alkaline fuel cells and soaked in 3 M's NaOH aqueous solution for 30 days without degradation. At 80° C., a water absorption rate of the F3h was 6%, and a water absorption swelling rate was 4%. At 80° C. and 2 atmospheres, F3h was used as a diaphragm for alkaline fuel cells with a power density of 1.3 W/cm².

Embodiment 4

1, 2.234 g (9.7 mmol) of p-terphenyl (CAS No. 92-94-5) with 0.046 g (0.2 mmol) of 1,3, 5-triphenylbenzene (CAS No. 612-71-5) and 1.616 g (10 mmol) of 3-quinuclidinone hydrochloride (CAS No. 1193-65-3) were dissolved in 120 mL dichloromethane, stirred 0° C., and added 20 mL trifluoromethanesulfonic acid and 10 mL trifluoroacetic acid slowly, and continued to stir for 72 hours after dripping, to obtain a viscous solution. The viscous solution was washed with 100 mL pure water, 20 mL NaOH aqueous solution (1 M) and 20 mL pure water in turn, and dried at 100° C. for 30 hours, to obtain a 3.12 g pale yellow powder like nitrogen-containing heterocyclic polymers P4a with a yield of 93%.

¹HNMR (600 MHz, DMSO-d₆, ppm) δ H=7.86-7.56 (13H), 4.32 (2H), 3.53 (1H), 3.21-3.13 (4H), 2.14-1.68 (4H).

2, 1.676 g the nitrogen-containing heterocyclic polymers P4a and 2.84 g (20 mmol) iodomethane were dissolved in 10 mL dimethyl sulfoxide and stirred reaction at 60° C. for 10 hours. After the reaction was completed, a resulting product was washed three times with 20 mL pure water and dried at 100° C. for 30 hours. 2.12 g pale yellow powder like quaternary ammonium salt polymers P4b were obtained with 89% yield.

¹HNMR (600 MHz, DMSO-d₆, ppm) δH=7.83-7.65 (13H), 4.52 (2H), 3.58 (1H), 3.56-3.35 (4H), 3.21 (3H), 2.21-1.91 (4H).

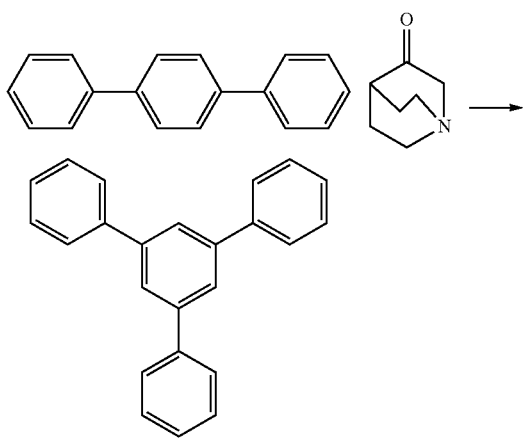

-continued
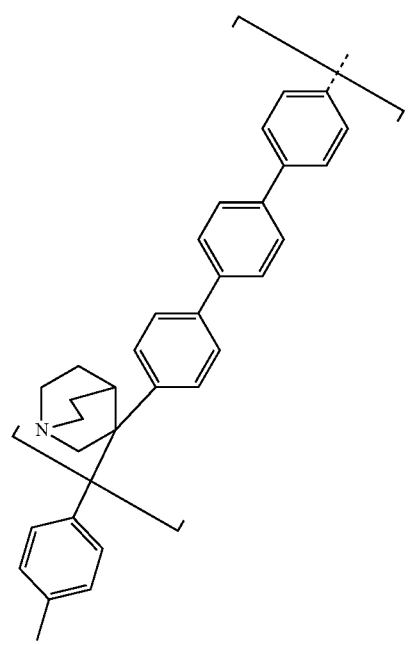
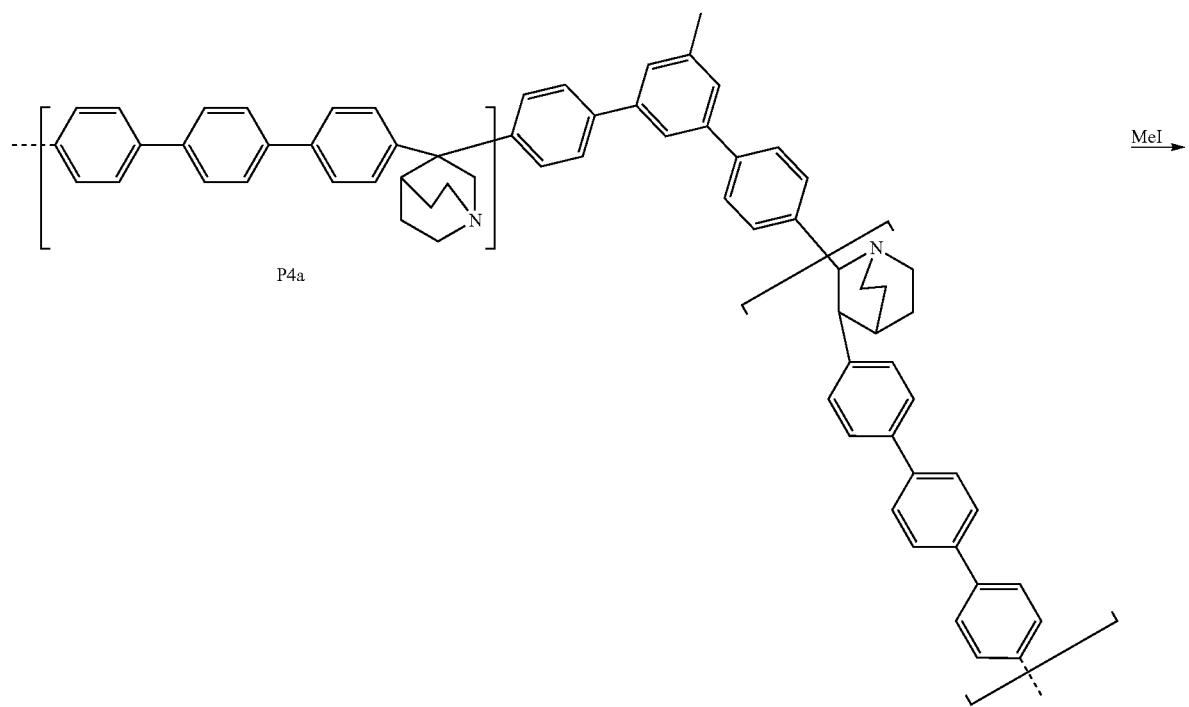
P4a

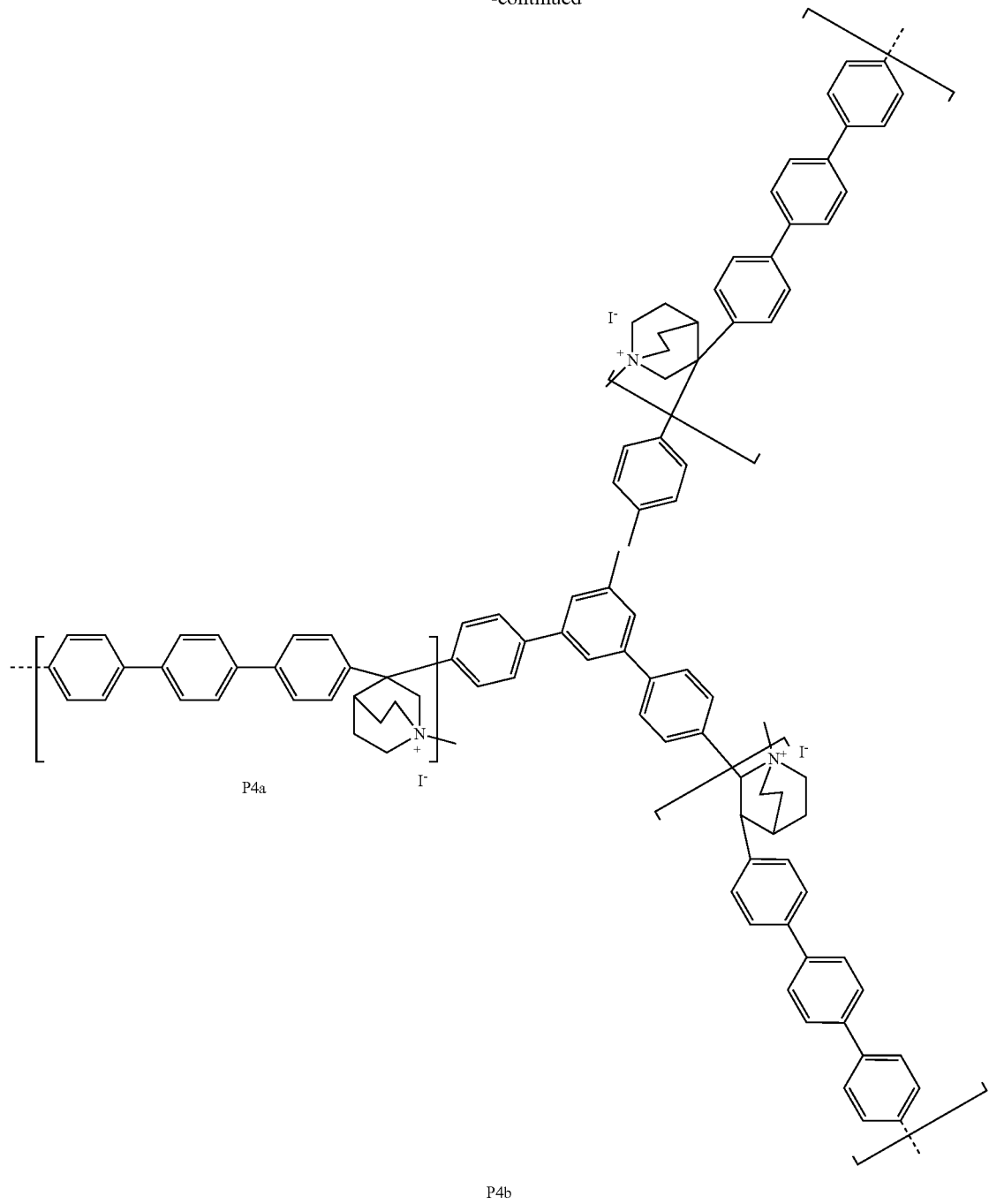

3, 100 mg of the nitrogenous heterocyclic polymers P4a were dissolved in 20 mL dimethyl sulfoxide to obtain a polymer solution. The polymer solution was coated on a glass plate and the glass plate was dried in the oven at 120° C. for 15 hours to obtain a polymer flat membrane F4a. A thickness of the F4a was 15 um, a tensile strength was 38 MPa, and a Young's modulus was 689 MPa. The F4a was used for nanofiltration separation of aluminum oxidation waste acid: a waste liquid with sulfuric acid concentration of 150 g/L and aluminum ion concentration of 20 g/L was used as mother liquid, filtration at 3 atmospheres and room temperature. In a filtrate, the concentration of sulfuric acid was increased to 190 g/L and the concentration of aluminum ion was reduced to 12 g/L. The F4a was used for the diffusion dialysis of aluminum oxidation waste acid. At room temperature, a concentration of sulfuric acid and aluminum ion in a dialysis solution was 132 g/L and 0.7 g/L.

4, the F4a was soaked in 1 M phosphoric acid aqueous solution at room temperature for 5 hours, washed with pure water three times after a film was taken out, and dried in an oven at 00° C. under nitrogen protection for 5 hours to obtain a proton exchange film F4b, a tensile strength of the F4b was 35 MPa and a Young's modulus was 578 MPa. At 160° C., a proton conductivity of the F4b was 65 mS/cm. At 180° C., a proton conductivity of F4b was 117 mS/cm.

5, 100 mg the polymers P4b were dissolved in 20 ML N,N-dimethylacetamide to obtain a polymer solution. The polymer solution was coated on a glass plate and dried in an oven at 80° C. for 5 hours, and then heated to 120° C. for 20 hours to obtain an iodide ion exchange film F4c with a tensile strength of 36 MPa. A Young's modulus was 625 MPa. At 80° C., a conductivity of the F4c is 75 mS/cm.

6. the F4c was soaked in 1 M NaCl aqueous solution at room temperature for 5 hours, a film was taked out and washed three times with pure water, and dried in the oven at 60° C. under nitrogen protection for 5 hours to obtain a chloride ion exchange film F4d, a tensile strength of the F4d was 39 MPa, and a Young's modulus was 695 MPa. At 80° C., a conductivity of the F4d is 118 mS/cm. When the F4d was used to extract lithium from salt lake by diffusion dialysis method, a concentration of lithium ion in mother liquor was 6 g/L, a concentration of magnesium ion was 120 g/L, and a concentration of lithium ion and magnesium ion in a dialysis liquor was 5.3 g/L and 1.2 g/L at room temperature.

7, the F4c was soaked in 1 M NaBr aqueous solution at room temperature for 5 hours, a film was taked out and washed three times with pure water, and dried in 100° C. oven under nitrogen protection for 5 hours to obtain a bromine ion exchange film F4e. A tensile strength of the F4e was 37 MPa and a Young's modulus was 632 MPa. At 80° C., a conductivity of the F4e is 95 mS/cm. When F4e was used in all-vanadium flow battery, a vanadium ion permeability is $3\times10^{-10}$ cm$^2$/s. When the F4e was immersed in 1.5 M VO$^{2+}$/3M H$_2$SO$_4$ solution for 30 days at 80° C., a conductivity is only reduced by 1%, and a all-vanadium flow battery was assembled, and a Coulomb efficiency was 99.2%.

8, the F4c was soaked in 1 M NaHCO$_3$ aqueous solution at room temperature for 5 hours, washed with pure water three times after a film was taken out, and dried in the oven at 100° C. under nitrogen protection for 5 hours to obtain a bicarbonate ion exchange film F4f. A tensile strength of the F4f was 35 MPa and a Young's modulus was 526 MPa. At 80° C., a conductivity of the F4f is 58 mS/cm.

9, the F4c was immersed in 1 M NaNO$_3$ aqueous solution for 5 hours at room temperature. a film was taken out and washed with pure water three times and dried in the oven at 100° C. under nitrogen protection for 5 hours to obtain a nitrate ion exchange membrane F4g. A tensile strength of the F4g was 33 MPa and a Young's modulus was 498 MPa. At 80° C., a conductivity of the F4g is 50 mS/cm.

10, the F4c was soaked in 1 M NaOH aqueous solution at room temperature for 5 hours, washed with pure water after a film was taken out, and dried in the oven at 100° C. under nitrogen protection for 5 hours to obtain a basic anion exchange film F4h, a tensile strength of the F4h is 41 MPa, and a Young's modulus was 725 MPa. At 80° C., a conductivity of the F4h was 120 mS/cm. The F4h was used as an electrolyte in alkaline fuel cells and soaked in 10 M NaOH aqueous solution for 30 days without degradation. At 80° C., a water absorption rate of F4h was 4%, and a water absorption swelling rate was 3%. At 80° C. and 2 atmospheres, the F4h was used as a diaphragm for alkaline fuel cells with a power density of 1.7 W/cm$^2$.

Embodiment 5

1, 2.303 g (10 mmol) of p-terphenyl (CAS No. 92-94-4), 0.808 g (5 mmol) of 3-quinuclidinone hydrochloride (CAS No. 1193-65-3) and 0.636 g (5 mmol) of 1,3-dimethylpiperidin-4-one (CAS No. 4629-80-5) were dissolved in 150 mL chloroform, stirred at 0° C., and added 5 mL trifluoromethanesulfonic acid slowly, after dripping was finished, continued to stir for 30 hours to obtain a viscous solution, washed the viscous solution in turn with 60 mL pure water, and dried at 110° C. for 20 hours. 2.958 g pale yellow powder like nitrogen-containing heterocyclic polymers P5a were obtained with 87% yield.

$^1$HNMR (600 MHz, DMSO-d$_6$, ppm) $\delta$ H=7.71-7.36 (24H), 4.27 (2H), 3.59-3.45 (4H), 3.25-3.20 (4H), 3.14-3.04 (7H), 1.95 (2H), 1.76 (2H), 0.98 (3H).

2, 1.693 g the nitrogen-containing heterocyclic polymers P5a, 1.42 g (10 mmol) iodomethane and 1.382 g (10 mmol) potassium carbonate were dissolved in 10 mL dimethyl sulfoxide and stirred reaction at 45° C. for 10 hours. After the reaction was completed, resulting products were washed three times with 20 mL pure water. After drying at 110° C. for 20 hours, 2.256 g pale yellow powder like quaternary ammonium salt polymers P5b were obtained with a yield of 94%.

$^1$HNMR (600 MHz, DMSO-d$_6$, ppm) $\delta$H=7.74-7.43 (24H), 4.51 (2H), 3.70 (2H), 3.53-3.48 (2H), 3.41-3.31 (6H), 3.19-3.08 (11H), 2.06 (2H), 1.83 (2H), 1.13 (3H).

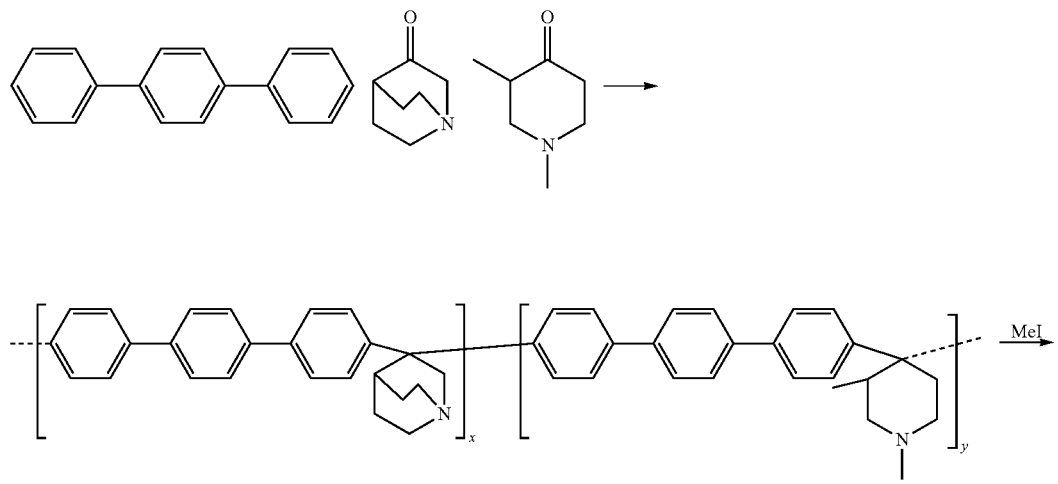

P7a

-continued

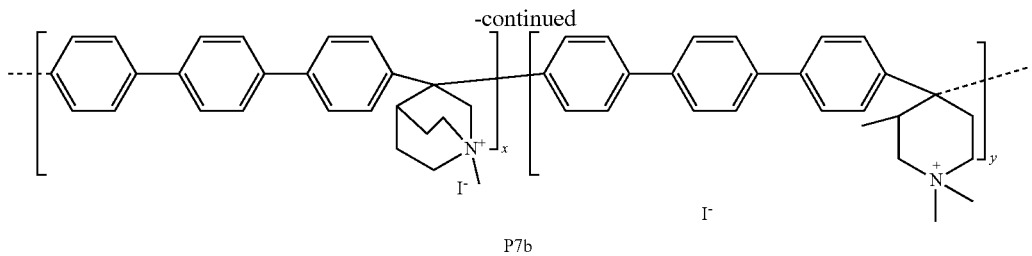

P7b

In the formula, x and y are a percentage of two structural units, x=y=50%.

3, 100 mg of the nitrogen-containing polymers P5a were dissolved in 20 ML dimethyl sulfoxide to obtain a polymer solution. The polymer solution was coated on a glass plate and the glass plate was baked at 100° C. for 15 hours to obtain a polymer flat membrane F5a. A thickness of the F5a is 13 um, a tensile strength is 23 MPa and a Young's modulus was 298 MPa. The F5a was used for nanofiltration separation of aluminum oxidation waste acid: a waste liquid with sulfuric acid concentration of 150 g/L and aluminum ion concentration of 20 g/L was used as mother liquid, filtration at 3 atmospheres and room temperature. In a filtrate, the concentration of sulfuric acid was increased to 189 g/L and the concentration of aluminum ion was reduced to 9 g/L. The F5a was used for diffusion dialysis of aluminum oxidation waste acid. At room temperature, a concentration of sulfuric acid and aluminum ion in a dialysis solution was 131 g/L and 0.6 g/L.

4, the F5a was soaked in 1 M phosphoric acid aqueous solution at room temperature for 5 hours, washed with pure water three times after a film was taken out, and dried in 100° C. oven under nitrogen protection for 5 hours to obtain a proton exchange film F5b. A tensile strength of the F5b was 20 MPa and a Young's modulus was 256 MPa. At 160° C., a proton conductivity of F5b was 65 mS/cm. At 180° C., the proton conductivity of F5b was 115 mS/cm.

5, 100 mg the polymers P5b were dissolved in 20 ml N-methylpyrrolidone to obtain a polymer solution. Then the polymer solution was coated on a glass plate and the glass plate was dried in an oven at 90° C. for 5 hours to obtain an iodide ion exchange film F5c, a tensile strength of the F5c is 19 MPa and a Young's modulus was 256 MPa. At 80° C., a conductivity of the F5c is 86 mS/cm.

6, the F5c was soaked in 1 M NaCl aqueous solution for 5 hours at room temperature, washed with pure water three times after a film was taken out, and dried in 100° C. oven under nitrogen protection for 5 hours to obtain a chloride ion exchange film F5d, a tensile strength of the F5d was 21 MPa and a Young's modulus was 278 MPa. At 80° C., a conductivity of the F5d is 116 mS/cm. When the F5d was used to extract lithium from salt lake by diffusion dialysis method, a concentration of lithium ion in mother liquor was 6 g/L, a concentration of magnesium ion was 120 g/L, and a concentration of lithium ion and magnesium ion in a dialysis solution was 4.9 g/L and 1.2 g/L respectively at room temperature.

7, the F5c was soaked in 1 M NaBr aqueous solution for 5 hours at room temperature, washed with pure water three times after a film was taken out, and dried in 100° C. oven under nitrogen protection for 5 hours to obtain a bromine ion exchange film F5e, a tensile strength of the F5e was 22 MPa and a Young's modulus was 285 MPa. At 80° C., a conductivity of the F5e was 98 mS/cm. When F5e was used in all-vanadium flow battery, a vanadium ion permeability was $4 \times 10^{-10}$ cm$^2$/s. When the F5e was immersed in 1.5 M VO$^{2+}$/3M H$_2$SO$_4$ solution for 30 days at 80° C., a conductivity was only reduced by 3%, and the all-vanadium flow battery was assembled, and a Coulomer efficiency is 98.2%.

8, the F5c was soaked in 1 M NaHCO$_3$ aqueous solution at room temperature for 5 hours, washed with pure water three times after a film was taken out, and dried in an oven at 100° C. under nitrogen protection for 5 hours to obtain a bicarbonate ion exchange film F5f. A tensile strength of the F5f was 19 MPa and a Young's modulus was 252 MPa. At 80° C., a conductivity of the F5f was 54 mS/cm.

9, the F5c was immersed in 1 M NaNO$_3$ aqueous solution at room temperature for 5 hours, washed with pure water three times after a film was taken out, and dried in an oven at 100° C. under nitrogen protection for 5 hours to obtain a nitrate ion exchange film F5g. A tensile strength of the F5g was 17 MPa and a Young's modulus was 231 MPa. At 80° C., a conductivity of the F5g was 61 mS/cm.

10, the F5c was soaked in 1 M NaOH aqueous solution at room temperature for 5 hours, washed with pure water after a film was taken out, and dried in an oven at 100° C. under nitrogen protection for 5 hours to obtain a basic anion exchange film F5h. A tensile strength of the F5h was 22 MPa, and a Young's modulus was 267 MPa. At 80° C., a conductivity of the F5h was 130 mS/cm. The F5h was used as a separator in alkaline hydrogen fuel cell and soaked in 10 M NaOH aqueous solution for 15 days without degradation. At 80° C., a water absorption rate of the F5h is 3%, and a water absorption swelling rate was 4%. At 80° C. and 2 atmospheres, F5h was used as a diaphragm for alkaline fuel cells with a power density of 1.7 W/cm$^2$.

Embodiment 6

1, 1.152 g (5 mmol) of p-terphenyl (CAS: 92-94-4), 0.771 g (5 mmol) of biphenyl (CAS: 92-52-4) and 1.616 g (10 mmol) of 3-quinuclidinone hydrochloride (CAS: 1193-65-3) were dissolved in 150 mL dichloromethane, stirred at 0° C., and added 8 mL trifluoromethanesulfonic acid and 1 mL trifluoroacetic acid slowly, and continued to stir for 20 hours after dripping, to obtain a viscous solution, the viscous solution was washed with 60 mL pure water in turn, and dried at 110° C. for 20 hours. 2.872 g pale yellow powder like nitrogen-containing heterocyclic polymers P6a were obtained with a yield of 96%.

$^1$HNMR (600 MHz, DMSO-d$_6$, ppm) δH=7.71-7.48 (10H), 4.29 (2H), 3.46 (1H), 3.23 (2H), 3.16 (2H), 1.87 (2H), 1.76 (2H).

2, 1.498g the nitrogen-containing heterocyclic polymers P6a, 1.42 g (10 mmol) iodomethane and 1.06 g (10 mmol) sodium carbonate were dissolved in 10 mL dimethyl sulfoxide and stirred reaction at 25° C. for 10 hours. After the reaction was completed, a resulting product was washed three times with 20 mL pure water and dried at 110° C. for 20 hours. 2.012 g pale yellow powder like quaternary ammonium salt polymers P6b were obtained with a yield of 91%. $^1$HNMR (600 MHz, DMSO-$d_6$, ppm) $^\delta$ H=7.76-7.54 (10H), 4.45 (2H), 3.49 (1H), 3.47 (2H), 3.31 (2H), 3.13 (3H), 1.98 (2H), 1.82 (2H).

washed with pure water three times, and dried in 100° C. oven under nitrogen protection for 5 hours to obtain a chloride ion exchange film F6d. A tensile strength of the Fod was 26 MPa and a Young's modulus was 326 MPa. At 80° C., a conductivity of the F6d is 105 mS/cm. When the F6d was used to extract lithium from salt lake by diffusion

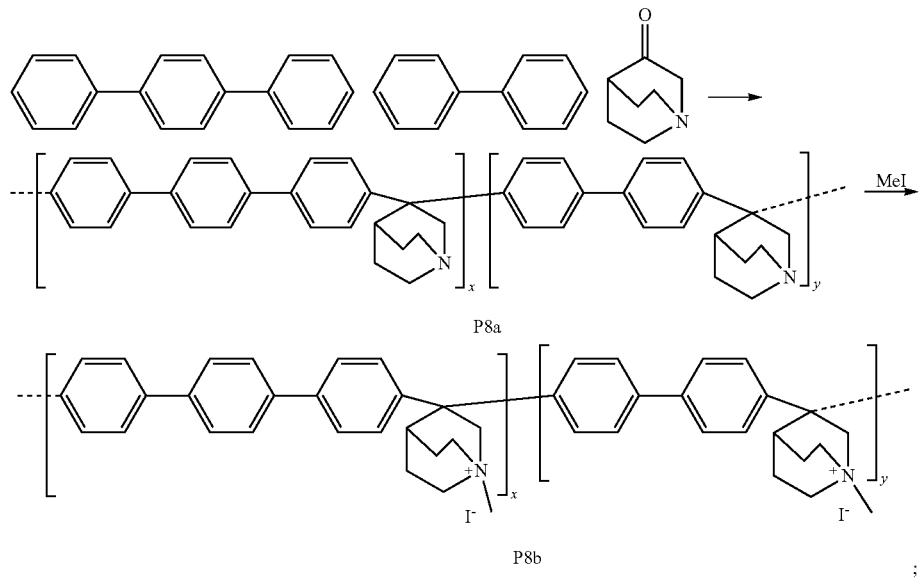

In the formula, x and y are a percentage of two structural units, x=y=50%.

3, 100 mg of the polymers P6a were dissolved in 20 ML dimethyl sulfoxide to obtain a polymer solution. The polymer solution was coated on a glass plate, and the glass plate was baked at 100° C. for 15 hours to obtain a polymer flat membrane F6a. A thickness of the F6a was 14 um, a tensile strength was 25 MPa, and a Young's modulus was 326 MPa. The F6a was used for nanofiltration separation of aluminum oxidation waste acid: a waste liquid with sulfuric acid concentration of 150 g/L and aluminum ion concentration of 20 g/L was used as mother liquid, filtration at 3 atmospheres and room temperature. In a filtrate, the concentration of sulfuric acid was increased to 170 g/L and the concentration of aluminum ion was reduced to 15 g/L. The F6a was used for diffusion dialysis of aluminum oxidation waste acid. At room temperature, a concentration of sulfuric acid and aluminum ion in a dialysis solution was 120 g/L and 0.9 g/L.

4, the F6a was soaked in 1 M phosphoric acid aqueous solution at room temperature for 6 hours, washed with pure water three times after a film was taken out, and dried in an oven at 100° C. under nitrogen protection for 5 hours to obtain a proton exchange film F6b. A tensile strength of the F6b was 21 MPa and a Young's modulus was 264 MPa. At 160° C., a proton conductivity of the F6b was 70 mS/cm. At 180° C., the proton conductivity of the F6b was 118 mS/cm.

5, 100 mg of the quaternary ammonium polymers P6b were dissolved in 20 ml N-methylpyrrolidone to obtain a polymer solution. The P6b solution was coated on a glass plate and the glass plate was baked at 120° C. for 20 hours to obtain an iodide ion exchange film F6c, a tensile strength of the F6c is 22 MPa and a Young's modulus was 282 MPa. At 80° C., a conductivity of the F6c was 89 mS/cm.

6, the F6c was soaked in 1 M NaCl aqueous solution at room temperature for 5 hours, a film was taked out and dialysis method, a concentration of lithium ion in mother liquor was 6 g/L, and a concentration of magnesium ion was 120 g/L. At room temperature, the concentration of lithium ion and magnesium ion in a dialysis liquor was 5.1 g/L and 0.8 g/L.

7, the F6c was soaked in 1 M NaBr aqueous solution at room temperature for 5 hours, a film was taked out and washed three times with pure water, and dried in 100° C. oven under nitrogen protection for 5 hours to obtain a bromine ion exchange film F6e, a tensile strength of the F6e was 24 MPa and a Young's modulus was 305 MPa. At 80° C., a conductivity of the F6e was 89 mS/cm. When the F6e was used in all-vanadium flow battery, a vanadium ion permeability is $3\times10^{-10}$ cm$^2$/s. When the F6e was immersed in 1.5 M VO$^{2+}$/3M H$_2$SO$_4$ solution for 30 days at 80° C., a conductivity was only reduced by 2%, and the all-vanadium flow battery was assembled, and a coulomer efficiency was 97.6%.

8, the F6c was soaked in 1 M NaHCO$_3$ aqueous solution at room temperature for 5 hours, washed with pure water three times after a film was taken out, and dried in an oven at 100° C. under nitrogen protection for 5 hours to obtain a bicarbonate ion exchange film F6f. A tensile strength of the F6f was 21 MPa and a Young's modulus was 276 MPa. At 80° C., a conductivity of the F6f was 50 mS/cm.

9, the F6c was soaked in 1 M NaNO$_3$ aqueous solution for 5 hours at room temperature, a film was taked out and washed with pure water three times, nitrogen protection in 100° C. drying oven for 5 hours, to obtain a nitrate ion exchange film F6g, a tensile strength of the F6g was 19 MPa, a Young's modulus of the F6g was 253 MPa. At 80° C., a conductivity of the F6g was 42 mS/cm.

10, the F6c was soaked in 1 M NaOH aqueous solution at room temperature for 5 hours, washed with pure water after a film was taken out, and dried in an oven at 100° C. under nitrogen protection for 5 hours to obtain a basic anion exchange film F6h, a tensile strength of the F6h was 23 MPa, and a Young's modulus was 298 MPa. At 80° C., a conductivity of the F6h was 116 mS/cm. The F6h was used as a diaphragm in alkaline hydrogen fuel cell and soaked in 10 M NaOH aqueous solution for 20 days without degradation. At 80° C., a water absorption rate of F6h was 2%, and a water absorption swelling rate was 3%. At 80° C. and 2 atmospheres, F6h was used as a diaphragm for alkaline fuel cells with a power density of 1.6 W/cm².

Embodiment 7

1, 2.303 g (10 mmol) p-terphenyl (CAS No. 92-94-4), 0.808 g (5 mmol) 3-quinuclidinone hydrochloride (CAS No. 1193-65-3) and 0.871 g (5 mmol) 2, 2, 2-Trifluoroacetophenone(CAS No. 434-45-7) were dissolved in 150 mL chloroform, stirred at 0° C., and added 5 mL trifluoromethanesulfonic acid slowly, after dripping was finished, continued to stir for 25 hours to obtain a viscous solution, washed the viscous solution with 60 mL pure water in turn, and dried at 110° C. for 20 hours. 3.32 g pale yellow powder like nitrogen-containing heterocyclic polymers Pa were obtained with a yield of 91%.

¹HNMR (600 MHz, DMSO-d₆, ppm) δ H=7.76-7.45 (29H), 4.31 (2H), 3.46 (1H), 3.18 (2H), 3.10 (2H), 1.96 (2H), 1.72 (2H).

2, 1.817 g the nitrogen-containing heterocyclic polymers P7a, 1.42 g (10 mmol) iodomethane and 1.01g (10 mmol) triethylamine were dissolved in 10 ml N-methylpyrrolidone and stirred reaction at 25° C. for 10 hours. After the reaction was completed, resulting products were washed three times with 20 mL pure water. After drying at 110° C. for 20 hours, 1.985 g pale yellow powder like quaternary ammonium salt polymers P7b were obtained with a yield of 92%.

¹HNMR (600 MHz, DMSO-d₆, ppm) δ H=7.78-7.51 (29H), 4.52 (2H), 3.46-3.39 (3H), 3.26 (2H), 3.16 (3H), 2.01 (2H), 1.78 (2H).

In the formula, x and y are a percentage of two structural units, x=y=50%.

3, 100 mg of the polymers P7a were dissolved in 20 mL dimethyl sulfoxide to obtain a polymer solution. The polymer solution was coated on a glass plate, and the glass plate was dried in an oven at 150° C. for 6 hours to obtain a polymer flat membrane F7a. A thickness of the F7a was 17 um, a tensile strength was 41 MPa, and a Young's modulus was 825 MPa. The F7a was used for nanofiltration separation of aluminum oxidation waste acid: a waste liquid with a sulfuric acid concentration of 150 g/L and a aluminum ion concentration of 20 g/L was used as mother liquid, filtration at 3 atmospheres and room temperature. In a filtrate, a concentration of sulfuric acid was increased to 165 g/L and a concentration of aluminum ion was reduced to 15 g/L. The F7a was used for diffusion dialysis of waste acid from aluminum oxidation. At room temperature, the concentration of sulfuric acid and aluminum ion in a dialysis solution was 135 g/L and 0.8 g/L. 4, the F7a was soaked in 1 M phosphoric acid aqueous solution at room temperature for 5 hours, a film was taked out and washed with pure water three times, and dried in an oven at 100° C. under nitrogen protection for 5 hours, a proton exchange film F7b was obtained. A tensile strength of the F7b was 35 MPa, and a Young's modulus was 716 MPa. At 160° C., a proton conductivity of the F7b was 45 mS/cm. At 180° C., a proton conductivity of the F7b was 98 mS/cm.

5, 100 mg of the quaternary ammonium polymers P7b were dissolved in 20 ml N-methylpyrrolidone to obtain a polymer solution. The P7b solution was coated on a glass plate and the glass plate was baked at 120° C. for 10 hours to obtain an iodide ion exchange film F7c. A tensile strength of the F7c was 43 MPa and a Young's modulus was 895 MPa. At 80° C., a conductivity of the F7c was 68 mS/cm.

6, the F7c was soaked in 1 M NaCl aqueous solution at room temperature for 5 hours, a film was taked out and washed three times with pure water, and dried in 100° C.

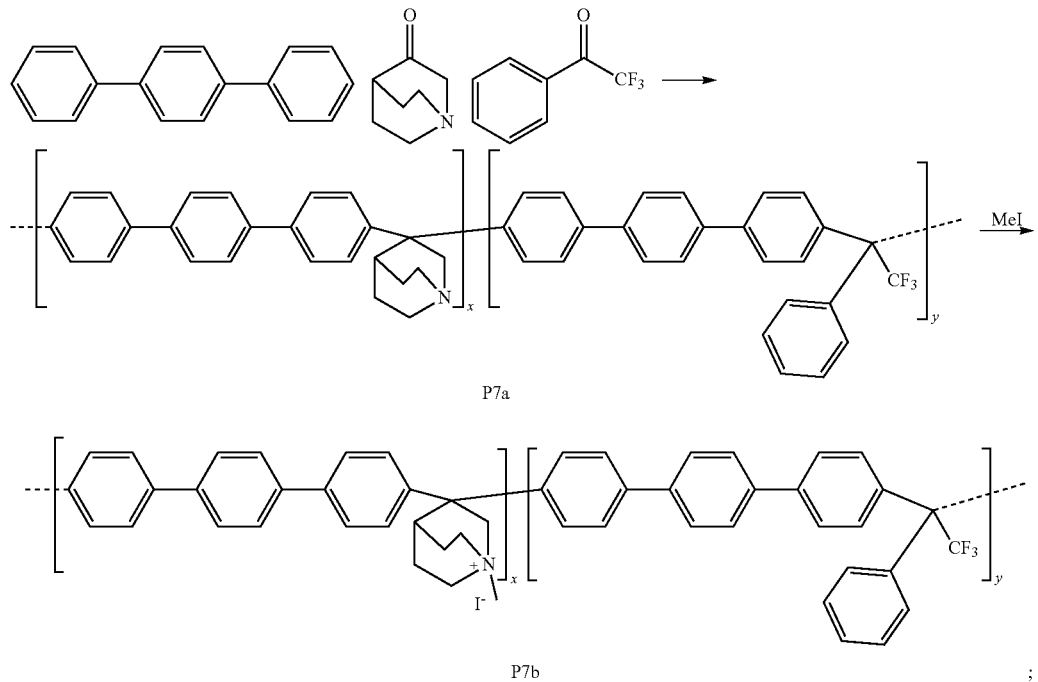

oven under nitrogen protection for 5 hours to obtain a chloride ion exchange film F7d. A tensile strength of the F7d was 45 MPa and a Young's modulus was 856 MPa. At 80° C., a conductivity of the F7d is 95 mS/cm. When the F7d was used to extract lithium from salt lake by diffusion dialysis method, a concentration of lithium ion in mother liquor was 6 g/L, and a concentration of magnesium ion was 120 g/L. At room temperature, the concentration of lithium ion in a dialysis liquor was 4.5 g/L and the concentration of magnesium ion was 1.5 g/L.

7, the F7c was soaked in 1 M NaBr aqueous solution at room temperature for 5 hours, a film was taked out and washed three times with pure water, and dried in 100° C. oven under nitrogen protection for 5 hours to obtain a bromine ion exchange film F7e. A tensile strength of the F7e was 46 MPa and a Young's modulus was 879 MPa. At 80° C., a conductivity of the F7e was 76 mS/cm. When the F7e was used in all-vanadium flow battery, a vanadium ion permeability was $1\times10^{-10}$ cm$^2$/s. When the F7e was immersed in 1.5 M VO$^{2+}$/3M H$_2$SO$_4$ solution for 30 days at 80° C., a conductivity was only reduced by 4%, and the all-vanadium flow battery was assembled, and a coulomer efficiency was 96.8%.

8, the F7c was soaked in 1 M NaHCO$_3$ aqueous solution at room temperature for 5 hours, a film was taked out and washed with pure water three times, and dried in an oven at 100° C. under nitrogen protection for 5 hours to obtain a bicarbonate ion exchange film F7f, a tensile strength of the F7f was 42 MPa, and a Young's modulus was 810 MPa. At 80° C., a conductivity of the F7f was 38 mS/cm.

9, the F7c was immersed in 1 M NaNO$_3$ aqueous solution at room temperature for 5 hours, washed with pure water three times after a film was taken out, and dried in an oven at 100° C. under nitrogen protection for 5 hours to obtain a nitrate ion exchange film F7g, a tensile strength of the F7g was 38 MPa, and a Young's modulus was 726 MPa. At 80° C., a conductivity of the F7g was 50 mS/cm.

10, the F7c was soaked in 1 M NaOH aqueous solution at room temperature for 5 hours, washed with pure water after a film was taken out, and dried in an oven at 100° C. under nitrogen protection for 5 hours to obtain F7h, a tensile strength of the F7h was 43 MPa, and a Young's modulus was 856 MPa. At 80° C., a conductivity of the F7h was 102 mS/cm. After soaking in 10 M NaOH aqueous solution for 20 days, there was no degradation phenomenon. At 80° C., a water absorption rate of F7h was 6%, and a water absorption swelling rate was 5%. Using F7h as a diaphragm for alkaline hydrogen fuel cell, a power density of the cell was 1.1 W/cm$^2$ at 80° C. and 2 atmospheres.

Embodiment 8

1, 1.78 g the nitrogen-containing heterocyclic polymers P1a, 0.639 g (4.5 mmol) iodomethane, 0.061 g (0.25 mmol) 1, 6-dibromohexane (CAS NO. 629-03-8) and 1.382 g (10 mmol) potassium carbonate were dissolved in 100 mL dimethyl sulfoxide. stirred reaction at 10° C. for 10 hours. After the reaction was completed, an obtained products were washed three times with 20 mL pure water and 20 mL methylene chloride, and dried at 100° C. for 30 hours to obtain 2.10 g pale yellow power like quaternized crosslinked polymers P8a with a yield of 85%.

$^1$HNMR (600 MHz, DMSO-d$_6$, ppm) $^\delta$ H=7.73-7.52 (12H), 4.38 (2H), 3.57 (1H), 3.41 (2H), 3.23-3.15 (5H), 2.12 (2H), 1.87 (2H), 1.72 (0.2 H), 1.25 (0.2H).

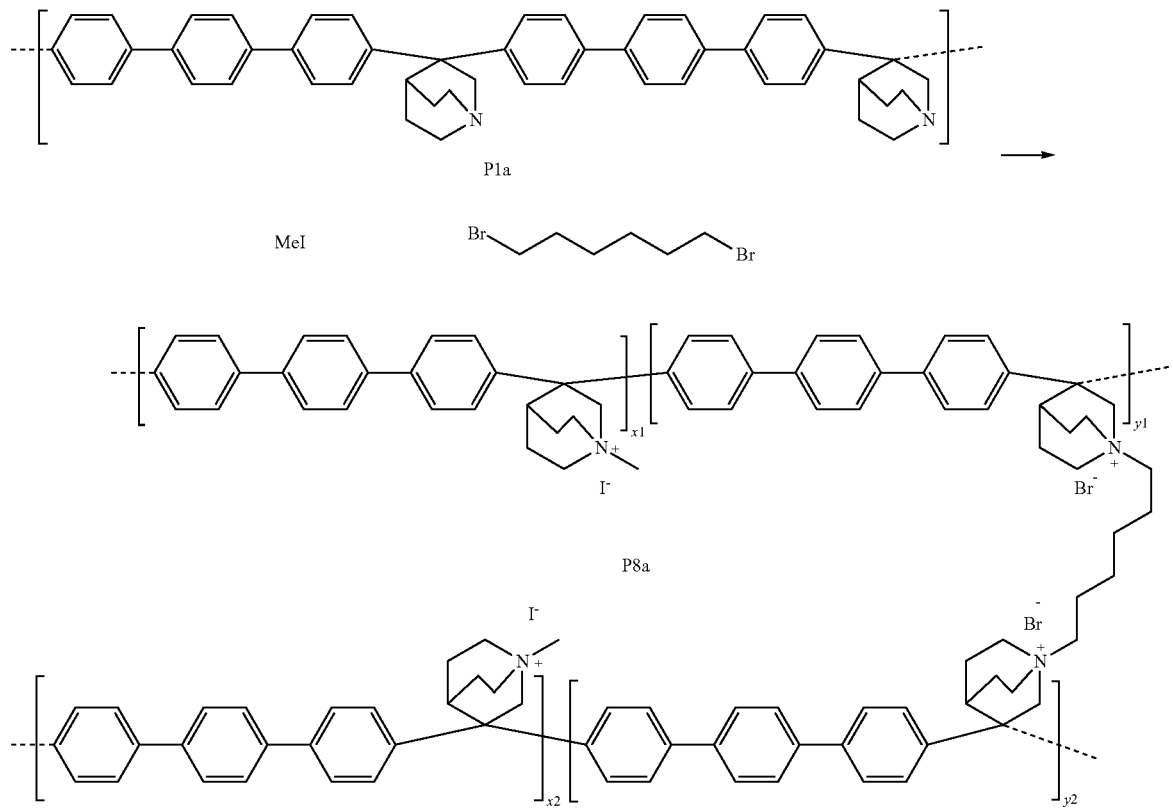

In the formula, x1, x2, y1, y2 are a percentages of each structural unit, x1+x2=90%, y1+y2=10%.

2, 100 mg of the crosslinked polymers P8a were dissolved in 20 mL of N-methylpyrrolidone to obtain a polymer solution. The polymer solution was coated on a glass plate and the glass plate was baked in an oven at 150° C. for 20 hours to obtain a polymer flat membrane F8a. A tensile strength of the F8a was 45 MPa and a Young's modulus was 836 MPa.

3, the F8a was soaked in 1 M NaOH aqueous solution at room temperature for 5 hours, a film was taked out and washed with pure water and dried in an oven at 100° C. under nitrogen protection for 8 hours to obtain a basic anion exchange film F8b. A tensile strength of the F8b was 43 MPa and a Young's modulus was 795 MPa. At 80° C., a conductivity of the F8b was 116 mS/cm. The F8b was used as a separator for alkaline hydrogen fuel cells and soaked in 10 M aqueous NaOH solution for 20 days without degradation. At 80° C., a water absorption rate of the F8b was 5%, and a water absorption swelling rate was 3%. At 80° C. and 2 atmospheres, the F8b was used as a diaphragm for alkaline hydrogen fuel cells with a power density of 1.9 W/cm$^2$.

Embodiment 9

1, 1.78 g the nitrogen-containing heterocyclic polymers P1a, 0.426 g (3 mmol) iodomethane and 0.101 g (1 mmol) triethylamine were dissolved in 60 mL dimethyl sulfoxide and stirred reaction at 25° C. for 10 hours. After the reaction was completed, obtained products were washed three times with 20 mL pure water and 20 mL ether in turn, and dried at 100° C. for 30 hours to obtain 2.12 g partially quaternary ammonium polymer powder P9a with a yield of 96%.

2, 441 mg the P9a and 48 mg (0.2 mmol) of 1, 6-dibromohexane (CAS NO. 629-03-8) were dissolved in 100 mL of N,N-dimethylformamide to prepare a homogeneous solution. The homogeneous solution was coated on a glass plate, and the glass plate was baked at 130° C. for 20 hours to obtain a polymer flat membrane F9a, a tensile strength of the F9a was 39 MPa, and a Young's modulus was 756 Mpa.

3, the F9a was soaked in 1 M NaOH aqueous solution at room temperature for 5 hours, washed with pure water after a film was taken out, and dried in an oven at 120° C. under nitrogen protection for 8 hours to obtain a basic anion exchange film F9b. A tensile strength of the F9b was 41 MPa and a Young's modulus was 829 MPa. At 80° C., a conductivity of the F9b was 142 mS/cm. The F9b was used as a separator for alkaline hydrogen fuel cells and soaked in 10 M NaOH aqueous solution for 15 days without degradation. At 80° C., a water absorption rate of the F9b was 8%, and a water absorption swelling rate was 6%. At 80° C. and 2 atmospheres, F9b was used as a diaphragm for alkaline hydrogen fuel cells with a power density of 1.8 W/cm$^2$.

Embodiment 10

1, 2.533 g (11 mmol) of p-terphenyl (CAS NO. 92-94-4), 1.616 g (10 mmol) of 3-quinuclidinone hydrochloride (CAS NO. 1193-65-3) and 0.056 g (0.5 mmol) of 1, 4-cyclohexandione (CAS No. 637-88-7) were dissolved in 150 mL dichloromethane, stirred at 0° C., and added 3 mL trifluoromethanesulfonic acid and 1 mL trifluoroacetic acid slowly, and continued to stir for 30 hours after dripping, to obtain a viscous solution, the viscous solution was washed with 60 mL pure water in turn, and dried at 100° C. for 30 hours. 3.212 g pale yellow powder like nitrogen-containing heterocyclic polymers P10a were obtained with a yield of 88%.

$^1$HNMR (600 MHz, DMSO-d$_6$, ppm) δH=7.75-7.63 (13H), 4.35 (2H), 3.57 (1H), 3.25 (2 H), 3.17 (2 H), 2.12 1.95 (2.2 H), 1.82 (2 H).

2, 1.822 g the P10a, 1.42 g (10 mmol) iodomethane and 0.101 g (1 mmol) triethylamine were dissolved in 10 mL dimethyl sulfoxide, stirred reacion at 45° C. for 10 hours, and washed products with 20 mL pure water three times after the reaction is completed. After drying at 100° C. for 30 hours, 2.056 g pale yellow powder like quaternary ammonium salt polymers P10b were obtained with a yield of 90%.

$^1$HNMR (600 MHz, DMSO-d$_6$, ppm) $^δ$ H=7.76-7.65 (13H), 4.54 (2H), 3.62 (1H), 3.49 (2H), 3.35 (2H), 3.22 (3H), 2.12-1.97 (2.2H), 1.89 (2H).

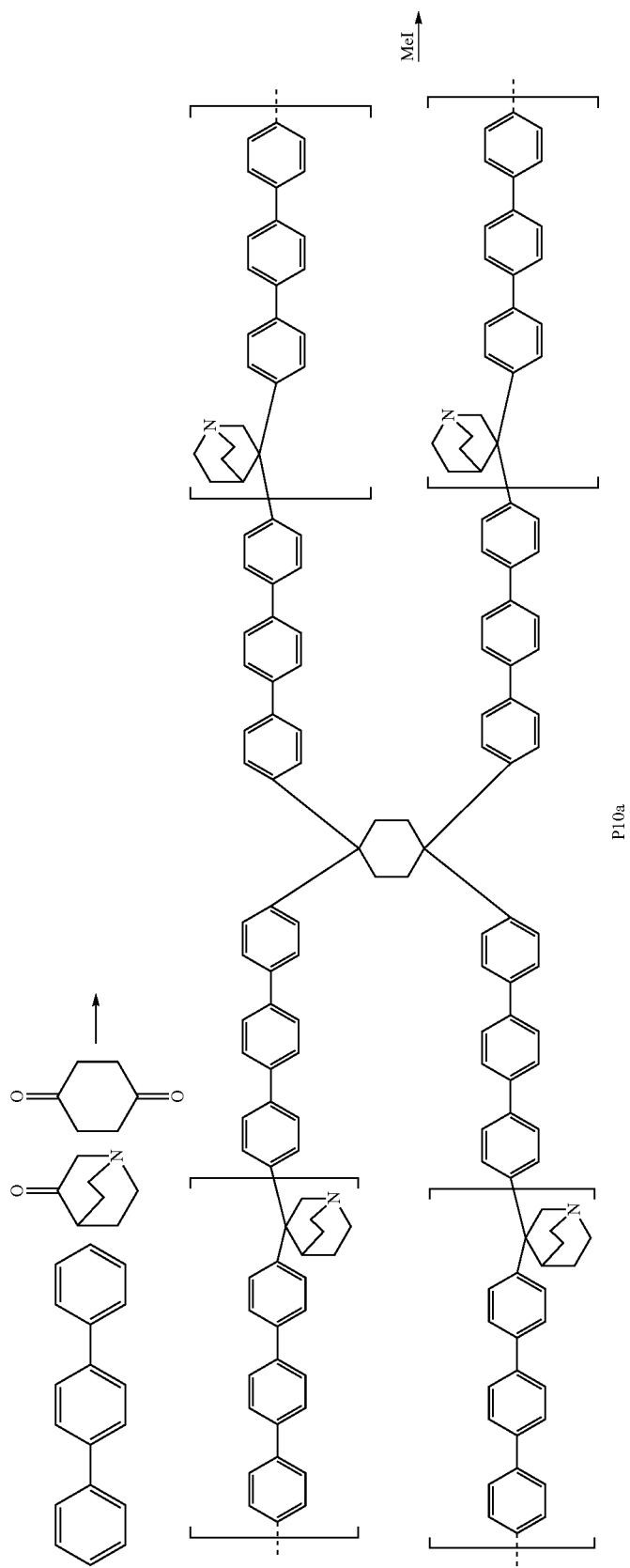

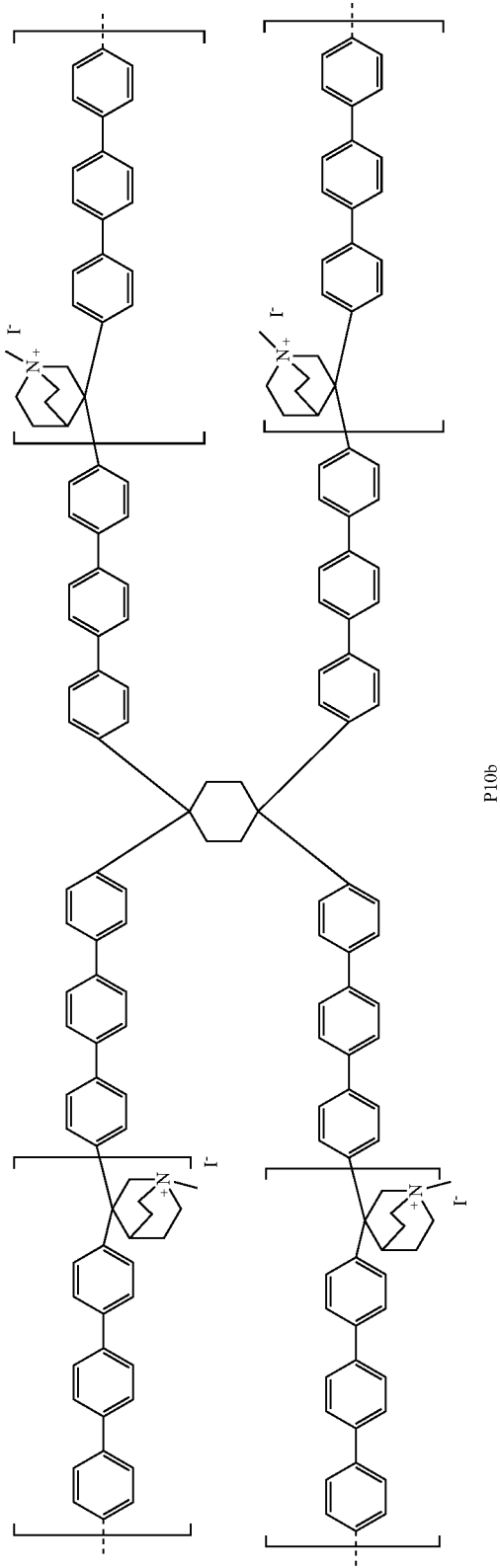
P10b 3, 100 mg of the nitrogen-containing heterocyclic polymers P10a and were dissolved in 20 mL dimethyl sulfoxide to obtain a polymer solution. The polymer solution was coated on a glass plate and the glass plate was dried in an oven at 120° C. for 8 hours to obtain a polymer flat membrane F10a with a thickness of 14 um and a tensile strength of 39 MPa, a Young's modulus is 868 MPa.

4, the F10a was soaked in 1 M phosphoric acid aqueous solution at room temperature for 5 hours, washed with pure water three times after a film was taken out, and dried in 100° C. oven under nitrogen protection for 10 hours to obtain a proton exchange membrane F10b, a tensile strength of the F10b was 35 MPa and a Young's modulus was 685 MPa. At 160° C., a proton conductivity of the F10b was 61 mS/cm. At 180° C., the proton conductivity of the F10b was 120 mS/cm.

5, 100 mg of the quaternary ammonium polymers P10b were dissolved in 20 mL N, N-dimethylacetamide to obtain a polymer solution, coating the polymer solution on a glass plate, drying the glass plate in an oven at 80° C. for 5 hours, and then heated up to 120° C. for 20 hours to obtain a film F10c. A tensile strength of the F10c was 35 MPa and a Young's modulus was 698 MPa. The F10c was soaked in 1 M NaOH aqueous solution at room temperature for 6 hours, a film was taked out and washed with pure water, and dried in an oven at 100° C. under nitrogen protection for 5 hours, a basic anion exchange film F10d was obtained. A tensile strength of the F10d was 37 MPa and a Young's modulus was 726 MPa. At 25° C., a conductivity of the F10d is 72 mS/cm. At 80° C., a conductivity of the F10d was 130 mS/cm. The F10d was used as a separator for alkaline hydrogen fuel cells and soaked in 10 M NaOH aqueous solution for 30 days without degradation. At 80° C., a water absorption rate of the F10d was 8%, and a water absorption swelling rate was 5%. At 80° C. and 2 atmospheres, the F10d was used as a diaphragm for alkaline hydrogen fuel cells with a power density of 1.4 W/cm$^2$.

Embodiment 11

1, 100 mg of the nitrogen-containing heterocyclic polymers P1a were dissolved in 200 mL dimethyl sulfoxide to obtain a polymer solution. A bunch of PVDF hollow fiber film was soaked in the polymer solution for 10 hours, and then dried at 150° C. for 10 hours to obtain a polymer hollow fiber film F11a. The F11a was used for nanofiltration separation of aluminum oxidation waste acid: a waste liquid with a sulfuric acid concentration of 150 g/L and a aluminum ion concentration of 20 g/L was used as mother liquid, filtered at 10 atmospheres and room temperature. In a filtrate, the sulfuric acid concentration was increased to 180 g/L and the aluminum ion concentration was reduced to 12 g/L. The hollow fiber membrane F11a was used for diffusion dialysis of waste acid from aluminum oxidation. At room temperature, a concentration of sulfuric acid and aluminum ion in a dialyzed solution was 135 g/L and 0.9 g/L respectively.

2, 100 mg of the quaternary ammonium polymers P1b were dissolved in 200 mL of N-methylpyrrolidone to obtain a polymer solution. A bunch of poly vinylidene fluoride (PVDF) hollow fiber film were soaked in the polymer solution for 10 hours, and then dried at 80° C. for 20 hours to obtain a polymer hollow fiber film F11b. When the F11b was used to extract lithium from salt lake by diffusion dialysis method, a concentration of lithium ion in mother liquor was 6 g/L, and a concentration of magnesium ion was 120 g/L. At room temperature, the concentration of lithium ion in a dialysis liquor was 5.2 g/L and the concentration of magnesium ion was 1.1 g/L.

Embodiment 12

1, 1000 mg of the nitrogen-containing heterocyclic polymers P4a were dissolved in 200 mL dimethyl sulfoxide to obtain a polymer solution. The polymer solution was then spun by dry-wet method (the polymer P4a solution was extruded from a gap of a ring spinnetting head, and a toluene core liquid was injected into a spinnetting head insert tube after a period of time) to prepare polymer hollow fiber membrane F12a. The F12a was used for nanofiltration separation of aluminum oxidation waste acid: a waste liquid with a sulfuric acid concentration of 150 g/L and a aluminum ion concentration of 20 g/L was used as mother liquid, filtered at 6 atmospheres and room temperature. In a filtrate, the sulfuric acid concentration was increased to 185 g/L and the aluminum ion concentration was reduced to 13 g/L. The polymer hollow fiber membrane F12a was used for diffusion dialysis of waste acid from aluminum oxidation. At room temperature, a concentration of sulfuric acid and aluminum ion in a dialysis liquor was 138 g/L and 0.7 g/L respectively.

2, 1000 mg of the quaternary ammonium polymers P4b were dissolved in 200 mL of N-methylpyrrolidone to obtain a polymer solution. The polymer solution was spun by dry-wet method (the polymer solution was extruded from a gap of a ring spinneret, and a toluene core liquid was injected into a spinneret insert tube after a period of time) to prepare polymer hollow fiber membrane F12b. When the F12b was used to extract lithium from salt lake by diffusion dialysis method, a concentration of lithium ion in mother liquor was 6 g/L, and a concentration of magnesium ion was 120 g/L. At room temperature, the concentration of lithium ion in dialysis liquor was 5.5 g/L, and the concentration of magnesium ion was 0.8 g/L.

Embodiment 13

1, 1.78 g the nitrogen-containing heterocyclic polymers P1a, 0.426 g (3 mmol) iodomethane and 0.101 g (1 mmol) triethylamine were dissolved in 10 mL dimethyl sulfoxide, stirred evenly at 25° C., coated the resulting mixture on a glass plate, and dry the glass plate in an oven at 120° C. for 30 hours, obtained films were soaked in dichloromethane and pure water successively, and then dried in 100° C. oven for 10 hours to obtain a polymer flat membrane F13a. A tensile strength of the F13a was 21 MPa, and a Young's modulus was 365 MPa.

2, the F13a was immersed in 1 M NaOH aqueous solution at room temperature for 5 hours to obtain a basic anion exchange film F13b, a tensile strength of the F13b was 23 MPa, a Young's modulus was 426 MPa. At 80° C., a conductivity of the F13b is 123 mS/cm. The F13b was used as a diaphragm in alkaline hydrogen fuel cell and soaked in 10 M NaOH aqueous solution for 15 days without degradation. At 80° C., a water absorption rate of the F13b was 8%, and a water absorption swelling rate was 6%. At 80° C. and 2 atmospheres, the F13b was used as a diaphragm for alkaline hydrogen fuel cells with a power density of 1.5 W/cm$^2$.

What is claimed is:

1. A class of nitrogen-containing heterocyclic polymers, wherein comprising a following general structural unit:

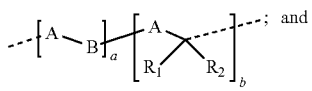; and $R_1$ and $R_2$ are respectively hydrogen atom, methyl group, ethyl group, trifluoromethyl group, pyridyl group, phenyl group, o-methylphenyl group, m-methylphenyl group, p-methylphenyl group or mesitylene group; a is any integer greater than or equal to 1; b is any integer greater than or equal to 0; and A group is selected from following structural formulas:

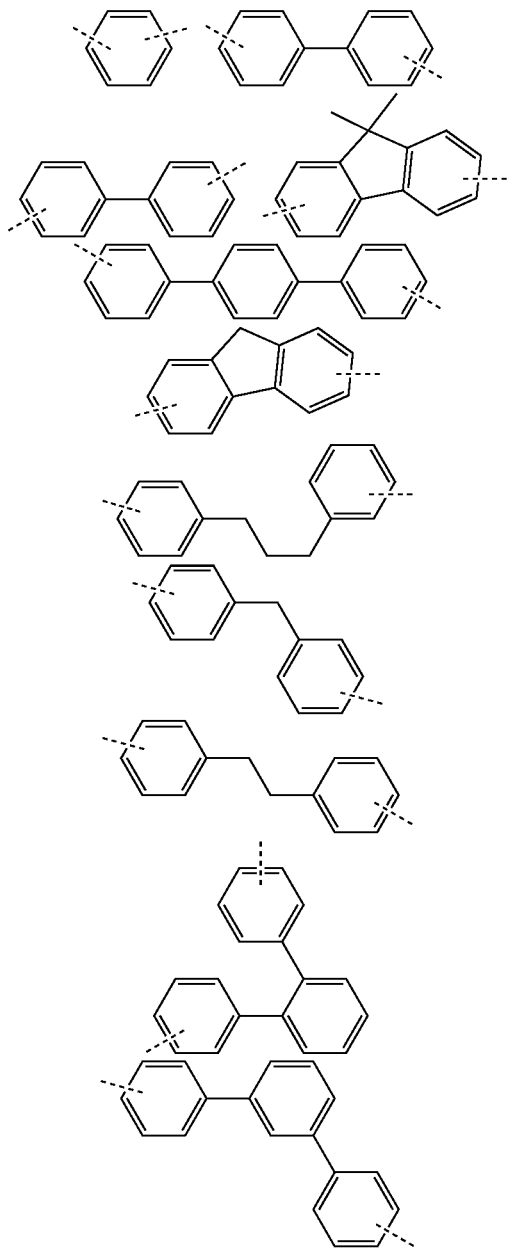

wherein, B group is a nitrogen-containing heterocycle and is selected from following structural formulas:

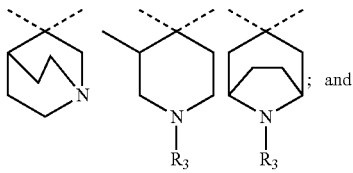; and $R_3$ is a hydrogen atom, methyl group, ethyl group, propyl group, butyl group, pentyl group, hexyl group, cyclopropyl group, isopropyl group, isobutyl group, tert butyl group, cyclopentyl group, cyclohexyl group, or N, N, N-trimethylpentamine group; and When both A and B are multiple groups, a combination of A and B in A-B is random, and an arrangement of different combinations is also random.

2. The nitrogen-containing heterocyclic polymers according to claim 1 are prepared by following methods, wherein in presence of an acid catalyst, a nitrogen-containing heterocyclic monomer C undergoes a Friedel-Crafts reaction with an aromatic monomer D, and the nitrogen-containing heterocyclic polymers are obtained; and the nitrogen-containing heterocyclic monomer C is one or more combinations of

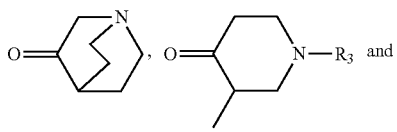

-continued

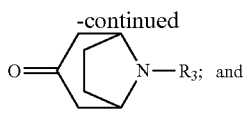

the aromatic monomer D is one or more combinations of benzene, biphenyl, 4,4-dimethylbiphenyl, fluorene, 9,9-dimethylfluorene, para-triphenyl, meta-triphenyl, ortho-triphenyl, diphenylmethane, 1,2-diphenylethane, 1,3-diphenylpropane, para-xylene dimer, 2.2-bis (3.4-dimethylphenyl) hexafluoropropane, 2,3-dimethyl-2,3-diphenylbutane, and 1,2-di (1-naphthyl) ethane.

3. The nitrogen-containing heterocyclic polymers according to claim 1 are prepared by following methods, wherein in presence of an acid catalyst, a nitrogen-containing heterocyclic monomer C, an aromatic monomer D, and a ketone monomer E undergo a Friedel-Crafts reaction, and the nitrogen-containing heterocyclic polymers are obtained;
the nitrogen-containing heterocyclic monomer C is one or more combinations of

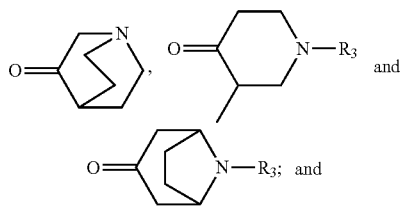

the aromatic monomer D is one or more combinations of benzene, biphenyl, 4,4-dimethylbiphenyl, fluorene, 9,9-dimethylfluorene, para-triphenyl, meta-triphenyl, ortho-triphenyl, diphenylmethane, 1,2-diphenylethane, 1,3-diphenylpropane, para-xylene dimer, 2,2-bis (3,4-dimethylphenyl) hexafluoropropane, 2,3-dimethyl-2,3-diphenylbutane, and 1,2-di (1-naphthyl) ethane; and
the ketone monomer E is selected from one or more combinations of following structures:

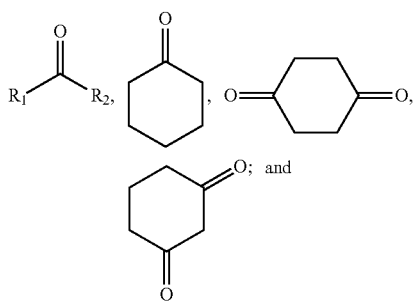

$R_1$ and $R_2$ are respectively hydrogen atom, methyl group, ethyl group, trifluoromethyl group, pyridine group, phenyl group, o-methylphenyl group, m-methylphenyl group, p-methylphenyl group or mesitylene group.

4. The nitrogen-containing heterocyclic polymers according to claim 1 are prepared by following methods, wherein in presence of an acid catalyst, a nitrogen-containing heterocyclic monomer C, an aromatic monomer D, and an aromatic crosslinking agent monomer F undergo a Friedel-Crafts reaction, and the nitrogen-containing heterocyclic polymers are obtained; and the nitrogen-containing heterocyclic monomer C is one or more combinations of

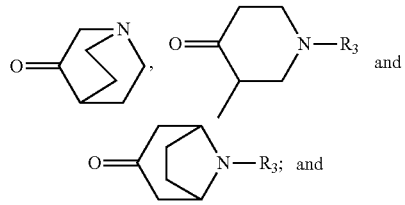

the aromatic monomer D is one or more combinations of benzene, biphenyl, 4,4-dimethylbiphenyl, fluorene. 9,9-dimethylfluorene, para-triphenyl, meta-triphenyl, ortho-triphenyl, diphenylmethane, 1.2-diphenylethane, 1,3-diphenylpropane, para-xylene dimer, 2,2-bis (3,4-dimethylphenyl) hexafluoropropane, 2,3-dimethyl-2,3-diphenylbutane, and 1,2-di (1-naphthyl) ethane; and
the aromatic crosslinking agent monomer F is one or more combinations of triphenylmethane, 1,3,5-triphenylbenzene, triptycene, 9,9'-spirobifluorene, tetraphenyl ethylene, tetraphenylmethane, and hexaphenylbenzene.

5. The nitrogen-containing heterocyclic polymers according to any one of claims 2 to 4, wherein:
the acid catalyst is one or more combinations of trifluoromethanesulfonic acid, trifluoroacetic acid, acetic acid, trichloroacetic acid, methylsulfonic acid, pentafluoropropionic acid, heptafluorobutyric acid, and perfluorosulfonic acid resin.

6. Quaternary ammonium salt polymers, a difference between a structure of the quaternary ammonium salt polymers and the nitrogen-containing heterocyclic polymers as claimed in claim 1 is: a nitrogen-containing heterocyclic ring of the quaternary ammonium salt polymers is one of structures of quaternary ammonium nitrogen heterocyclic rings as follows:

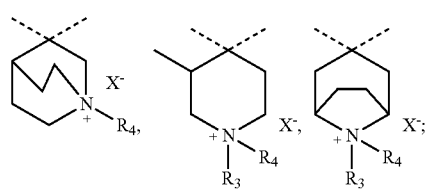

$R_4$ is any one of methyl group, ethyl group, propyl group, butyl group, pentyl group, hexyl group, heptyl group, octyl group, nonyl group, decyl group, cyclopropyl group, isopropyl group, isobutyl group, tert-butyl group, cyclopentyl group, cyclohexyl group, and N, N, N-trimethylpentamine group.

7. Quaternary ammonium cross-linked polymers prepared by following method, wherein:
in presence of alkali or no alkali, a quaternized cross-linking reaction is carried out between the nitrogen-containing heterocyclic polymers as claimed in claim 1 and a polyhalogenated compound, and nitrogen sites involved in the quaternized cross-linking reaction accounted for 0.001-10% of all nitrogen sites; after the reaction is completed, partial ammoniated cross-linked intermediate polymers are obtained, and then, remaining nitrogen sites of the intermediate polymer undergo quaternization without crosslinking reaction with a monohalogenated compound, to obtain the quaternary ammonium crosslinked polymers;

or in presence of alkali or no alkali, a quaternized reaction without cross-linking is carried out between the nitrogen-containing heterocyclic polymers as claimed in claim 1 and a monohalogenated compound, and nitrogen sites participating in the quaternized reaction without cross-linking accounted for 0.90-99.999% of all nitrogen sites; after the reaction is completed, partial quaternized intermediate polymers are obtained; a quaternized cross-linking reaction is carried out between remaining nitrogen sites of the intermediate polymers and a polyhalogenated compound, to obtain the quaternary ammonium crosslinked polymers;

or in presence of alkali or no alkali, a quaternized cross-linking reaction is carried out between the nitrogen-containing heterocyclic polymers as claimed in claim 1, a polyhalogenated compound and a monohalogenated compound at the same time, and nitrogen sites participating in the quaternized cross-linking reaction account for 0.001-10% of all nitrogen sites; after the reaction is completed, the quaternary ammonium crosslinked polymers are obtained; and the polyhalogenated compound is selected from one or more combinations of following structures:

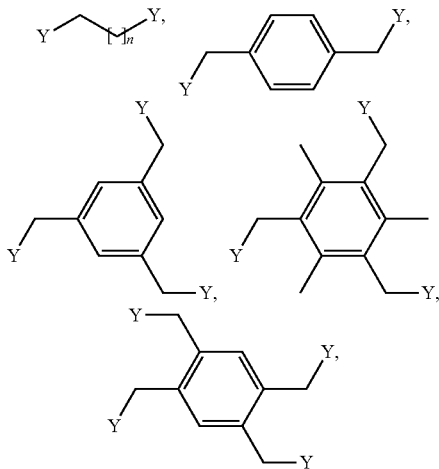

wherein, Y is F, Cl, Br or I, and n is an integer between 0 and 12; and the monohalogenated compound is one or more combinations of iodomethane, iodoethane, iodopropane, iodobutane, iodopentane, iodohexane, iodoheptane, iodooctane, iodononane, iododecane, bromomethane, bromoethane, bromopropane, bromobutane, bromopentane, bromohexane, bromoheptane, bromooctane, bromononane, bromodecane, cyclopropyl iodine, isopropyl iodine, isobutyl iodine, cyclopentyl iodine, cyclohexyl iodine and (5-bromopentyl) trimethylammonium bromide; and the alkali is one or more combinations of sodium bicarbonate, potassium bicarbonate, cesium bicarbonate, sodium carbonate, potassium carbonate, cesium carbonate, calcium carbonate, sodium hydroxide, potassium hydroxide, calcium oxide, calcium hydroxide, trimethylamine, triethylamine, N, N-dimethylethylenediamine and N, N-diisopropylethylamine.

8. A polymer flat membrane, wherein prepared by following method:

dissolving any one or more of the nitrogen-containing heterocyclic polymers as claimed in claim 1, the quaternary ammonium salt polymers as claimed in claim 6, and the quaternary ammonium crosslinked polymers as claimed in claim 7 in an organic solvent, obtaining a polymer solution;

or dissolving at least one of the nitrogen-containing heterocyclic polymers as claimed in claim 1 and the intermediate polymers as claimed in claim 7 in an organic solvent with the monohalogenated compound and/or the polyhalogenated compound, obtaining a polymer solution; and casting or moulding the polymer solution onto a substrate, drying to obtain the polymer flat membrane; and the organic solvent is one or more combinations of dimethyl sulfoxide, N, N-dimethylformamide, N, N-dimethylacetamide, N-methylpyrrolidone, tetrahydrofuran, chloroform, dichloromethane, toluene, ethylbenzene, xylene, and ethyl acetate; and the substrate is a glass sheet, a copper sheet, an iron sheet, a ceramic sheet, a polytetrafluoroethylene sheet, a polyethylene terephthalate membrane, a polyamide membrane, a polytetrafluoroethylene membrane, a polyethylene membrane, a polypropylene membrane, a polyimide membrane, a carbon fiber membrane, or a glass fiber membrane.

9. A proton exchange membrane, wherein prepared by following method:

soaking the polymer flat membrane as claimed in claim 8 in phosphoric acid aqueous solution, a concentration of the phosphoric acid aqueous solution is 0.1-20M, and a soaking temperature is 0-90° C., to obtain the proton exchange film.

* * * * *